(12) United States Patent
Ikeda et al.

(10) Patent No.: US 6,360,052 B1
(45) Date of Patent: Mar. 19, 2002

(54) METHOD AND DEVICE FOR ADDING INFORMATION TO VIDEO SIGNAL, METHOD AND DEVICE FOR DETECTION INFORMATION FROM VIDEO SIGNAL, AND RECORDING MEDIUM

(75) Inventors: Nozomu Ikeda, Tokyo; Akira Ogino, Chiba; Takehiro Sugita, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/089,134

(22) Filed: Jun. 2, 1998

(30) Foreign Application Priority Data

Jun. 5, 1997 (JP) ............................................... 9-147960

(51) Int. Cl.[7] .............................................. H04N 5/913
(52) U.S. Cl. ........................................... 386/65; 386/95
(58) Field of Search ............................. 386/65, 95, 94, 386/46, 52, 61, 1, 4, 62; 380/3, 4, 5, 9, 10; 360/15, 60; H04N 5/913

(56) References Cited

U.S. PATENT DOCUMENTS 3,984,624 A    10/1976    Waggener
5,319,735 A  * 6/1994    Preuss et al.
6,023,551 A  * 2/2000    Sugita et al. .................. 386/94
6,058,243 A  * 5/2000    Ogino et al. .................. 386/94

FOREIGN PATENT DOCUMENTS

| EP | 0360615 | 3/1990 |
| EP | 0400906 | 12/1990 |
| EP | 0778566 | 6/1997 |

* cited by examiner

*Primary Examiner*—Robert Chevalier
(74) *Attorney, Agent, or Firm*—Jay H. Maioli

(57) ABSTRACT

An additional information is spectrally spread and superimposed on a video signal over a plurality of fields, and the superimposed additional information is detected easily. A time code information is spectrally spread using the first spectrally spreading code string synchronous to the video signal, and the spectral spread signal of the time code information is superimposed on the video signal. An additional information is spectrally spread using the second spectrally spreading code string generated synchronously to the sync signal of the video signal and having a different period or different content corresponding to the time code information, and the spectral spread signal of the additional information is superimposed on the video signal.

13 Claims, 30 Drawing Sheets

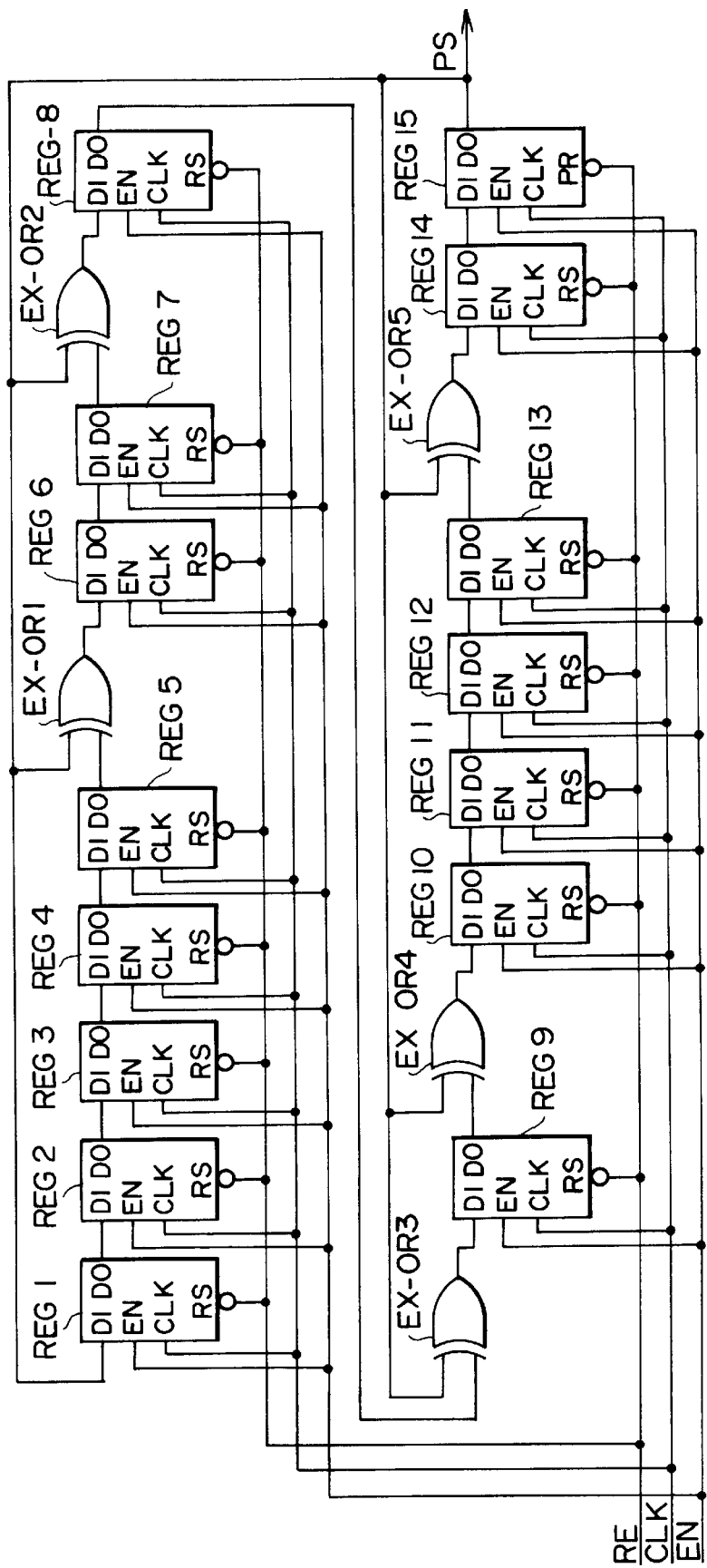
F I G. 6

SPECTRUM OF TIME CODE INFORMATION BEFOR SPECTRAL SPREAD

SPECTRUM OF TIME CODE INFORMATION BEFOR SPECTRAL SPREAD

SPECTRUM OF VIDEO SIGNAL ON WHICH SS TIME CODE INFORMATION IS SUPERIMPOSED

SIGNAL SPECTRUM AFTER INVERSE SPREAD

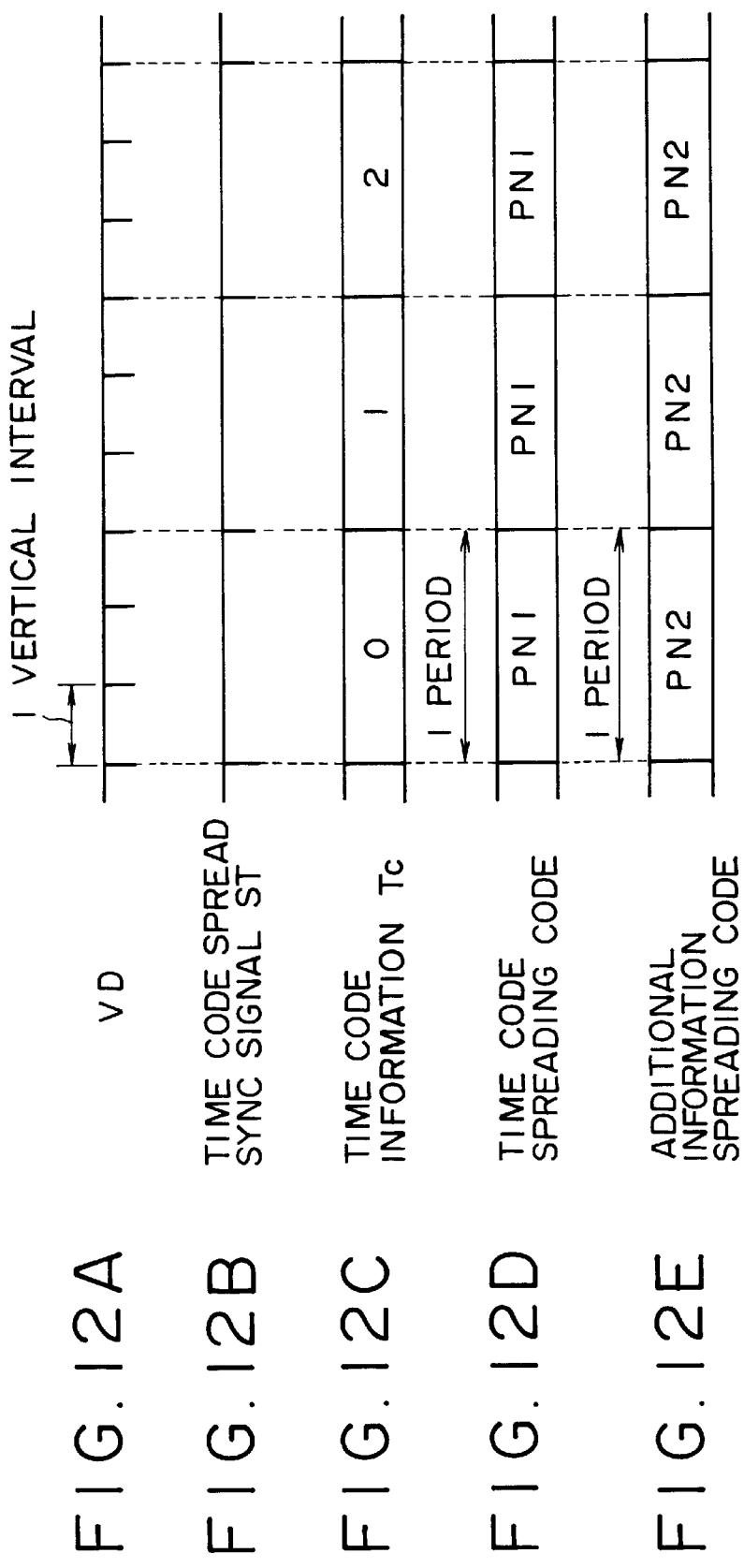

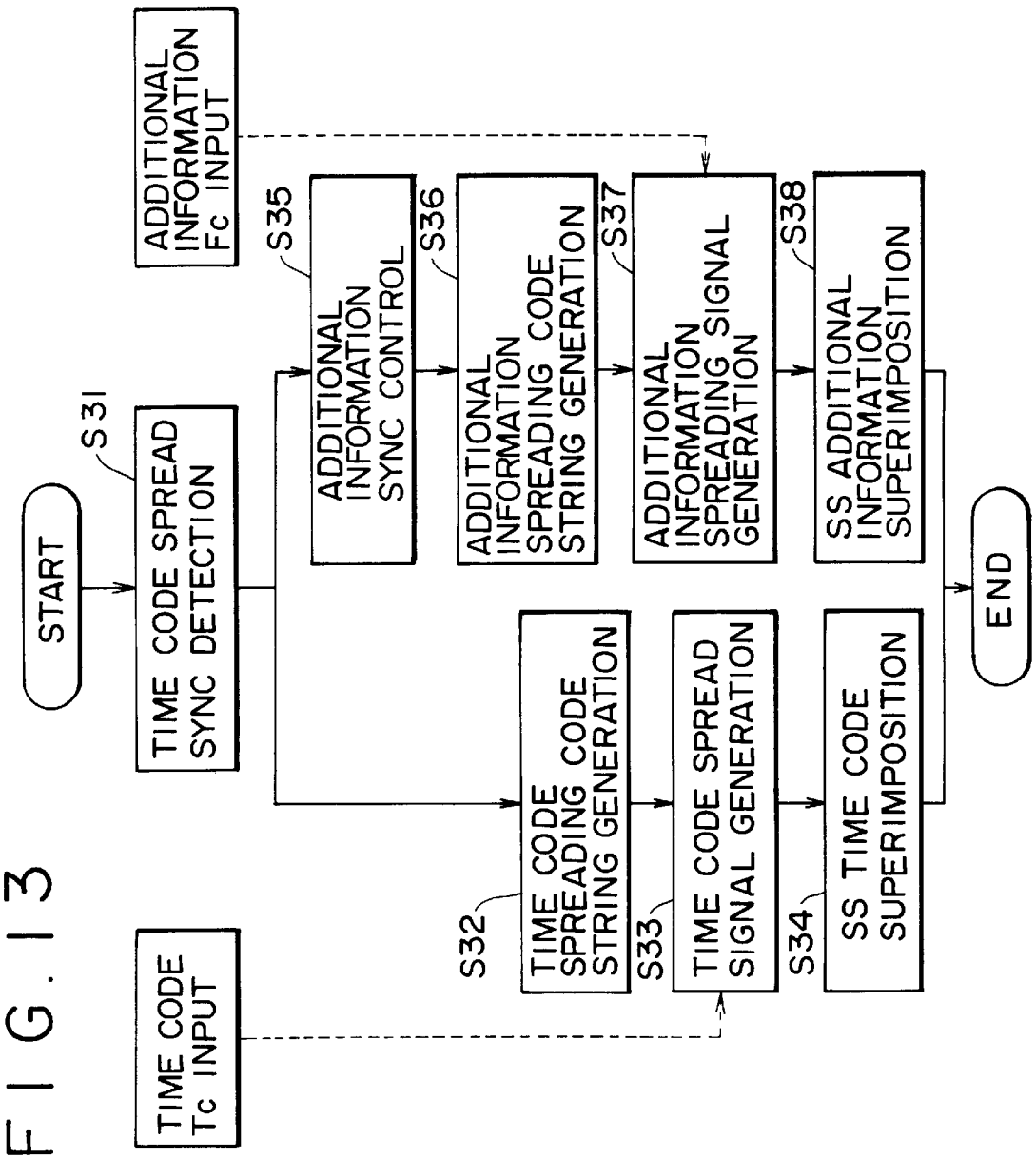

FIG.14A  VD

FIG.14B  TIME CODE SPREAD SYNC SIGNAL ST

FIG.14C  TIME CODE INFORMATION Tc

FIG.14D  TIME CODE SPREADING CODE

FIG.14E  ADDITIONAL INFORMATION SPREAD SYNC SIGNAL SF

FIG.14F  ADDITIONAL INFORMATION SPREADING CODE

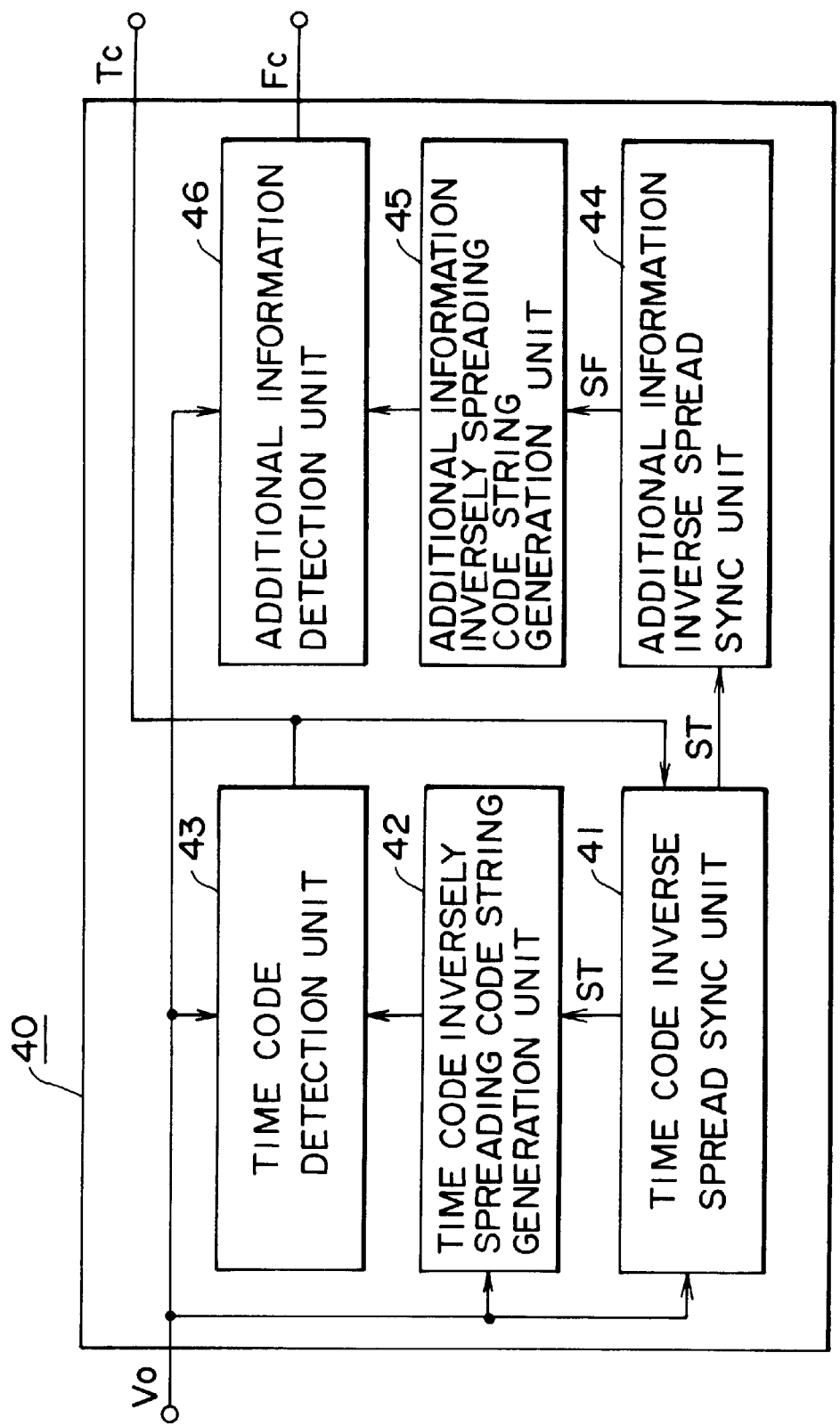

METHOD AND DEVICE FOR ADDING INFORMATION TO VIDEO SIGNAL, METHOD AND DEVICE FOR DETECTION INFORMATION FROM VIDEO SIGNAL, AND RECORDING MEDIUM

BACKGROUND OF THE INVENTION

1. Field of the Invention

This invention relates to a device and method for superimposing and adding an time code information on, for example, a video signal, and a device and method for superimposing and adding a time code information and an additional information such as an anti-duplication control information in correlation to the time code information on a video signal.

2. Description of Related Art

The VTR (Video Tape Recorder) has been popularized, a lot of software which is reproducible using a VTR has been provided. Recently, digital playback devices such as digital VTRs and DVDs (Digital Video Disc) are now used practically, and pictures of good quality and sound of good quality can be easily played back and viewed.

However, on the other hand, the popularization gives rise to a problem that such abundant software are duplicated without any restriction, and heretofore various duplication prevention measures have been developed.

For example, though it is a method for inhibiting not directly duplication of analog video signals, a method in which the difference in AGC (Auto Gain Control) system or APC (Auto Phase Control) characteristics between a recording device such as a VTR and a monitor receiver for displaying a picture is utilized to prevent duplication substantially is available.

In detail, for example, a method in which a VTR performs AGC using a pseudo sync signal inserted in an video signal and a monitor receiver employs AGC system not using the pseudo sync signal is an example of the former method, and in the method, an extraordinarily high level pseudo sync signal is previously inserted as a sync signal for AGC when an analog video signal is recorded in an original recording medium, and then the extraordinarily high level pseudo sync signal is inserted in a video signal supplied from a playback VTR to a recording VTR as a sync signal for AGC.

A method utilizing the difference in APC characteristics in which the APC in a VTR follows a color burst signal in a video signal with a short time constant but the APC in a monitor receiver follows with a relatively long time constant is an example of the latter method, and in the method, the phase of a color burst signal of an video signal is previously inverted partially when analog video signals are recorded in an original recording medium, and then the video signal having the partially inverted color burst signal is outputted as a video signal supplied from a playback VTR to a recording VTR.

In the case described herein above, the monitor receiver which receives supply of the analog video signal from the playback VTR plays back a picture normally without receiving an adverse effect of the partial phase inversion of the color burst signal used for the pseudo sync signal and APC.

However, in the VTR which receives supply of the analog video signal having the inserted pseudo sync signal described herein above supplied from the playback VTR or subjected to the phase inversion control of the color burst signal and records the analog video signal in a recording medium, the VTR can not perform gain control or phase control based on the input signal, and records the video signal not normally. Therefore, a normal picture can not be viewed when the recorded video signal is played back.

In the case involving an analog video signal as described herein above, the duplication prevention method is not a method for inhibiting duplication, but a method for obtaining pictures which can not viewed normally, therefore it is said that this method is merely a passive duplication prevention control.

On the other hand, when digitized information, for example, a video signal is involved, a duplication prevention control signal including a duplication prevention code or a duplication generation control code is added to a video signal as a digital data and recorded in a recording medium in order to perform direct duplication prevention control, for example, duplication inhibition.

FIG. 1 is a fundamental structural diagram of a duplication device for processing this digitized information, and the device sends a digital video information played back by a digital playback device 200 to a digital record device 210 through a digital transmission channel 220, and plays back the digital video information if it is of duplication permitted and inhibits duplication if it is of duplication inhibited.

In a recording medium 201 mounted on the digital playback device 200, an anti-duplication control information is recorded in addition to the digital video information as an addition information. This anti-duplication control information indicates duplication prohibition, duplication permission, or generation limit as the control content. Digital reproduction unit 202 reads the digital information from the record medium 201, acquires the playback prevention control information with the digital video information, and sends it to the digital recording device 210 through digital transmission path 220.

The duplication prevention control signal detection unit 212 of the digital recording device 210 detects the duplication prevention control signal from the information which is received through the digital transmission path 220, and identifies the control contents. This identification result is transmitted to the digital recording unit 211.

If the identification result obtained from the duplication prevention control signal supplied from the duplication prevention control signal detection unit 212 is a signal which indicates the permission of recording of the digital video information inputted through the digital transmission path 220, the digital recording unit 211 converts the above-mentioned input digital video signal into a digital information suitable for recording, and writes it in a recording medium 213 to perform recording. On the other hand, if identification result obtained from duplication prevention control signal supplied from the duplication prevention control signal detection unit 212 is duplication inhibition, the digital record unit 211 does not perform record processing of the above-mentioned input digital video information.

If the identification result obtained from the duplication prevention control signal supplied from the duplication prevention control signal detection unit 212 is a signal which permits only the first generation duplication, the digital record unit 211 converts the above-mentioned input digital signal into digital video information suitable for recording, writes it in the recording medium 213, and performs recording, and it changes the anti-duplication control signal used as an addition information to a signal for indicating duplication inhibition (duplication inhibition of the next generation), and records it in the recording medium 213. Accordingly, the video signal cannot be duplicated using the duplicated recording medium 213

As described herein above, in the case of so-called digital connection for supplying a video signal as major information signal and an anti-duplication control signal as an addition information to a recording device in the form of a digital signal, because an anti-duplication control signal is included in the transmitted digital data, the recording device performs duplication prevention control such as duplication inhibition using this anti-duplication control signal consistently.

In the case that the digital playback device of FIG. 1 is, for example, a digital VTR, the digital VTR converts only the video signal namely the major information signal and sound signal into an analog signal through a D/A conversion circuit 203 in order to monitor the played back video signal and sound signal, and guides it to the analog output terminal 204, to which usually a monitor television set is connected.

As described herein above, even though a playback device for digital information is involved, the anti-duplication control signal is not included in the analog signal guided to the analog output terminal 204. Hence, in the case of analog connection that analog VTR is connected to the analog output terminal 204, the information signal is duplicated undesirably.

So it comes to mind that an anti-duplication control signal is superimposed and added to the D/A converted video signal and sound signal, however it is difficult to add the anti-duplication control signal, to extract it in the recording device, and to use it for duplication prevention control without deterioration of the D/A converted video signal and sound signal.

Accordingly, heretofore, only the way to prevent duplication in the case of analog connection has been the passive duplication prevention method which utilizes the above-mentioned difference of AGC system between a VTR and monitor television set or the above-mentioned difference of characteristics of APC.

However, in the case of the above-mentioned duplication prevention control method which utilizes difference of AGC system between a VTR and monitor television set or difference of characteristics of APC, it can happen that the video signal is recorded normally, that is, even the passive duplication prevention can not be performed depending on the AGC system or APC characteristics of the recording device side. Further, the method can cause a problem that a playback picture displayed on the monitor television set is abnormal.

As a duplication prevention control system which is used effectively for either analog connection and digital connection while the above-mentioned problems are solved without deterioration of a played back video signal and sound signal, the inventors of this invention proposed previously a method in which an anti-duplication control signal is spectrally spread, the spectrally spread anti-duplication control signal is superimposed on a video signal, and the video signal is recorded as a digital signal or an analog signal (refer to Japanese Patent Application No.-Hei-339959, UP Patent Application No. 08/755101).

In this system, a PN (Pseudorandom Noise) series code used as a spread code (referred to as PN code hereinafter) is generated with a sufficiently short period, and spectral spread is performed by multiplying the anti-duplication control signal by the PN code, and then the narrow-band high level anti-duplication control signal is converted into a wide-band low level signal which does not adversely affect the video signal and sound signal, and the spectrally spread anti-duplication control signal superimposed on an analog video signal is recorded in a recording medium. In this case, the signal to be recorded in the recording medium may be either a video signal or digital signal.

In this system, because the anti-duplication control signal is superimposed on a video signal as a spectrally spread wide-band low level signal, it is difficult for the person who wants to duplicate illegally to remove the superimposed anti-duplication control signal from video signal.

On the other hand, it is possible to detect and use the superimposed anti-duplication control signal by performing inverse spectral spread. Accordingly the anti-duplication control signal is provided to the recording device side with the video signal surely, and in the recording device side, the anti-duplication control signal is detected, and the duplication control corresponding to the detected anti-duplication control signal can be performed surely.

By the way, to superimpose the anti-duplication control signal namely the additional information on the video signal by the above-mentioned spectral spread system without deterioration of the playback picture, it is required that the additional information spectrally spread with a sufficiently low level for causing no deterioration of the S/N ratio of the video signal is superimposed on the video signal. In order to obtain such level, it is required that the code length of the spectrally spreading PN code is sufficiently long.

But when the code length is long as described herein above, a method in which a matched filter is used or sliding correlation is used can not be used practically as a synchronizing method for matching the phase of the inverse spreading PN code to that of the spreading PN code when spectrally spreading because it takes very long time for synchronizing.

It is considered that the spectrally spreading PN code string is generated synchronously to the video sync signal, because the PN code string which was used in reverse spreading is obtained easily only by generating a PN code string synchronously to a video sync signal. The additional information can be superimposed relatively easily without deterioration of the video signal as described above if a PN code having a long period of a plurality of fields is used as the PN code having a sufficiently long code length.

However, because time code information for indicating time continuity is not added usually to a video signal, there is no means to estimate the relation to the field, fields adjacent to a frame, or a frame. To generate a PN code over a plurality of fields more than two or over a plurality of frames, it is required that a means for identifying synchronization of a unit of the plurality of fields or the plurality of frames is used separately, and as such means, a method in which information for synchronizing to the spectral spread code is inserted and added in the vertical blanking period of the video signal is considered possible to be applied.

However information of a vertical blanking period is not transmitted usually when a video signal is transmitted as a digital signal. Hence, sync information of spectral spread is transmitted as a digital additional information in addition to the digital video signal, however, in the case of analog connection in which the above-mentioned digital information is D/A converted and outputted, the sync information is eliminated. To avoid this problem, in the case of analog connection, the sync information of spectral spread is generated again from the time code provided as the digital additional information, and inserted and added in the vertical blanking period of the analog video signal, however such troublesome operation is disadvantageous.

When an additional information is spectrally spread using the spectral spread code spread over a plurality of fields or a plurality of frames, in the case of a method for detecting synchronization in which synchronization is detected by merely indicating the head position, if field data was eliminated by field thinning processing or field data was inserted by field interpolation processing, and the method results in changing of the synchronizing phase to lead no synchronization of the PN code for inverse spread because such elimination or insertion of the field data is not detected.

In the case that the additional information is an anti-duplication control signal, such result means that the anti-duplication control signal is changed by the above-mentioned method.

In view of the above-mentioned problems, it is an object of the present invention to provides a method and device for superimposing surely a time code for indicating time continuity of the picture on the video signal regardless that the video signal is an analog video signal or a digital video signal.

It is another object of the present invention to provide a method and device in which, for example, an additional information such as an anti-duplication signal is spectrally spread and superimposed on an interval which continues over a plurality of fields or a plurality of frames of the video signal, and is detected easily.

SUMMARY OF THE INVENTION

The method for adding information to a video signal of the present invention comprises a step for generating a timing signal based on a sync signal of the video signal, a step for periodically generating a time code information signal synchronously to the timing signal, a step for periodically generating a first spectral spread code string synchronously to the timing signal, a step for generating a second spectral spread code string correspondingly to the time code information signal synchronously to the timing signal, a step for generating a spread time code signal by spectrally spreading the time code information signal using the first spectral spread code string, a step for generating a spread additional information signal by spectrally spreading an additional information signal using the second spectral spread code string, and a step for adding the spread time code signal and the spread additional information signal to the video signal.

According to the present invention, it is possible to make illegal alteration processing more difficult in the case that the additional information is a secret information such as an anti-duplication control signal.

BRIEF DESCRIPTION OF THE DRAWINGS

FIG. 6 is a partial block diagram for illustrating a detailed exemplary structure of FIG. 5.

FIG. 12A–FIG. 12E are a time chart for describing operations in the first embodiment shown in FIG. 11.

FIG. 13 is a flow chart for describing operations in the first embodiment shown in FIG. 11.

FIG. 14A–FIG. 14F are a time chart for describing operations of another example of the first embodiment shown in FIG. 11.

FIG. 15 is a block diagram of the first embodiment of the additional information detection device in accordance with the present invention.

DETAILED DESCRIPTION OF THE PREFERRED EMBODIMENTS

Embodiments of the present invention are described in detail with reference to drawings hereinafter.

A time code information detection device and an embodiment of the time code information addition device will be described.

Figure 1:
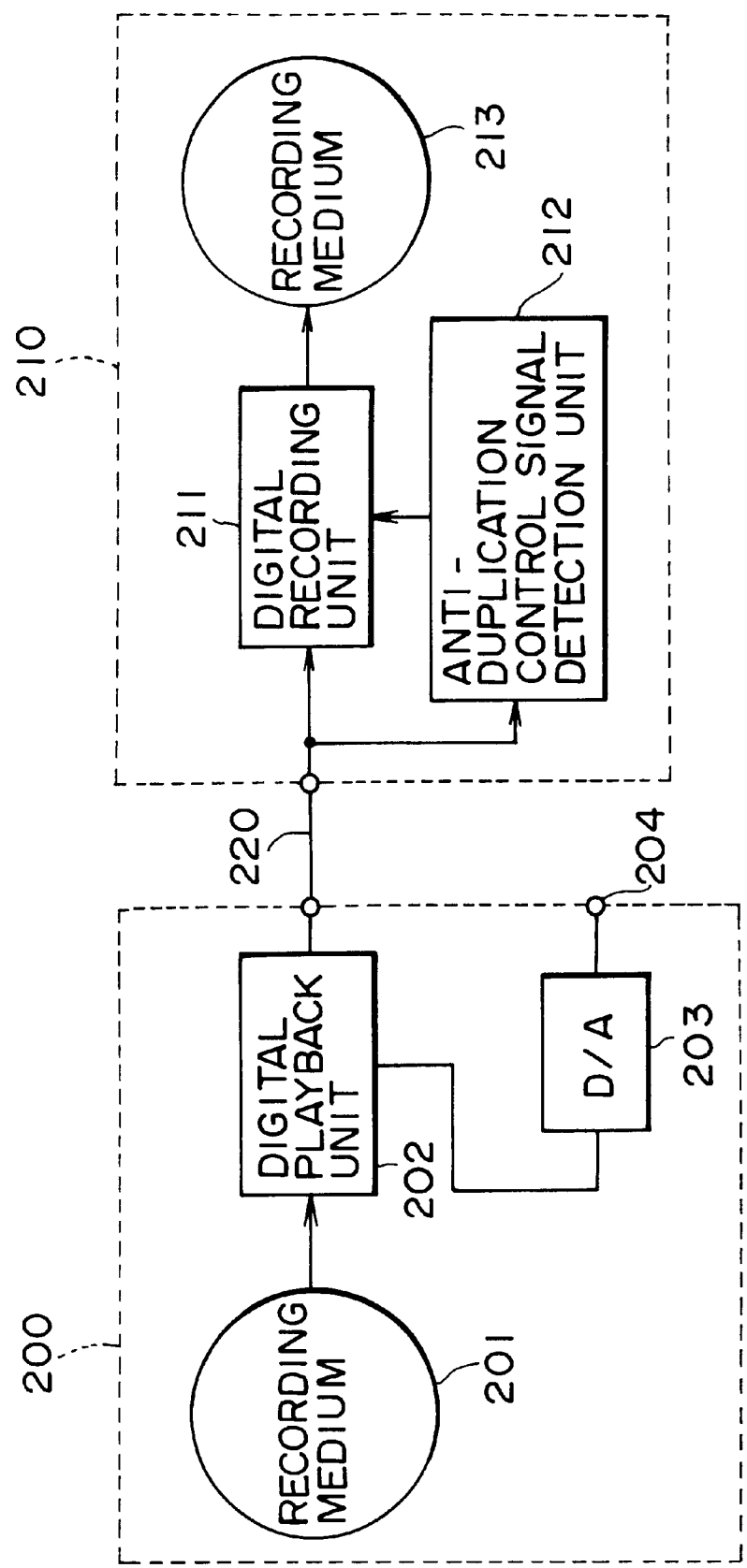
FIG. 1 is a block diagram for illustrating an exemplary structure of a duplication prevention control system.
Figure 2:
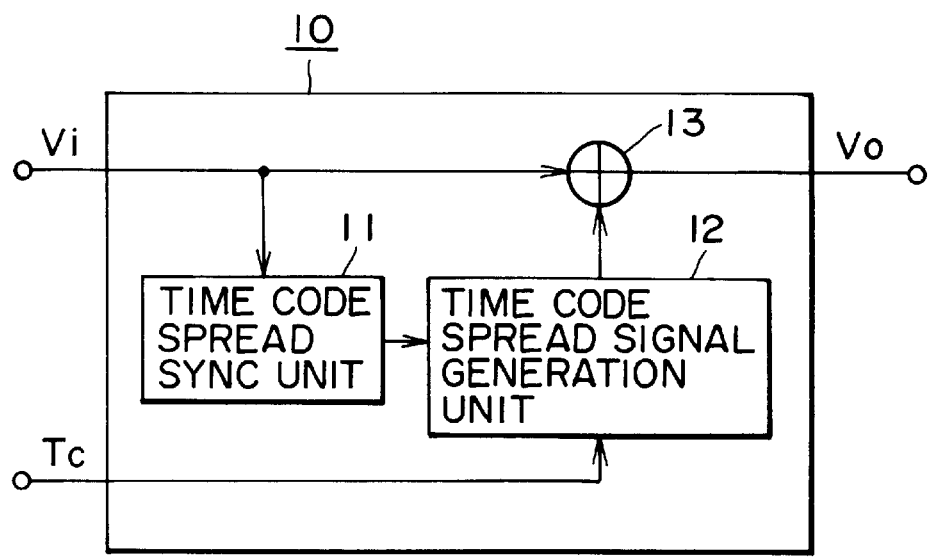
FIG. 2 is a block diagram for illustrating an embodiment of a time code information addition device with accordance with the present invention.

FIG. 2 is a block diagram for illustrating the structure of the time code information addition device 10 of this embodiment, and the time code information addition device 10 comprises a time code spread sync unit 11, a time code spread signal generation unit 12, and a superimposition unit 13 which constitute a time code spread signal superimposition means 13.

An Input video signal Vi is inputted to the time code information addition device 10. This input video signal Vi may be an analog video signal or may be a digital video signal. The Input video signal Vi is supplied to the time code spread sync unit 11, and supplied to the superimposition unit 13.

Figure 3:
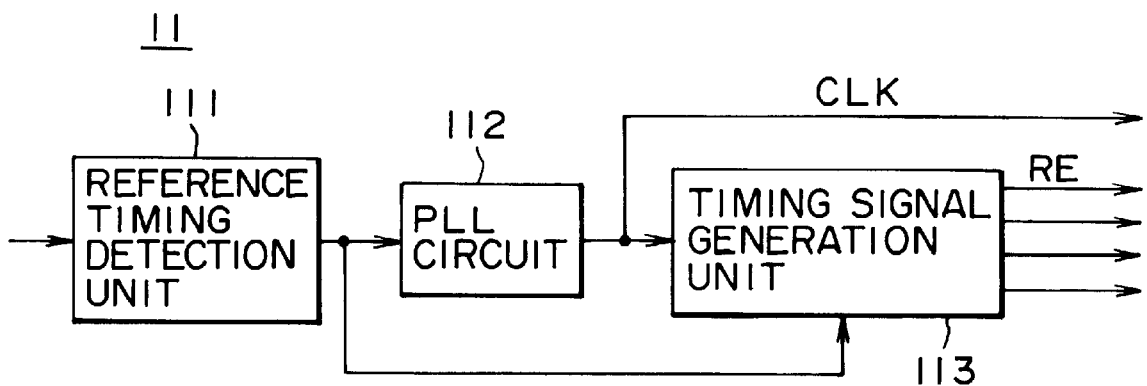
FIG. 3 is a partial block diagram for illustrating an exemplary structure of FIG. 2.

The time code spread sync unit 11 generates a timing signal synchronous to the sync signal of the input video signal Vi, and for example, as shown in FIG. 3, comprises a reference timing detection unit 111, a PLL circuit 112, and a timing signal generation unit 113.

Figure 4:
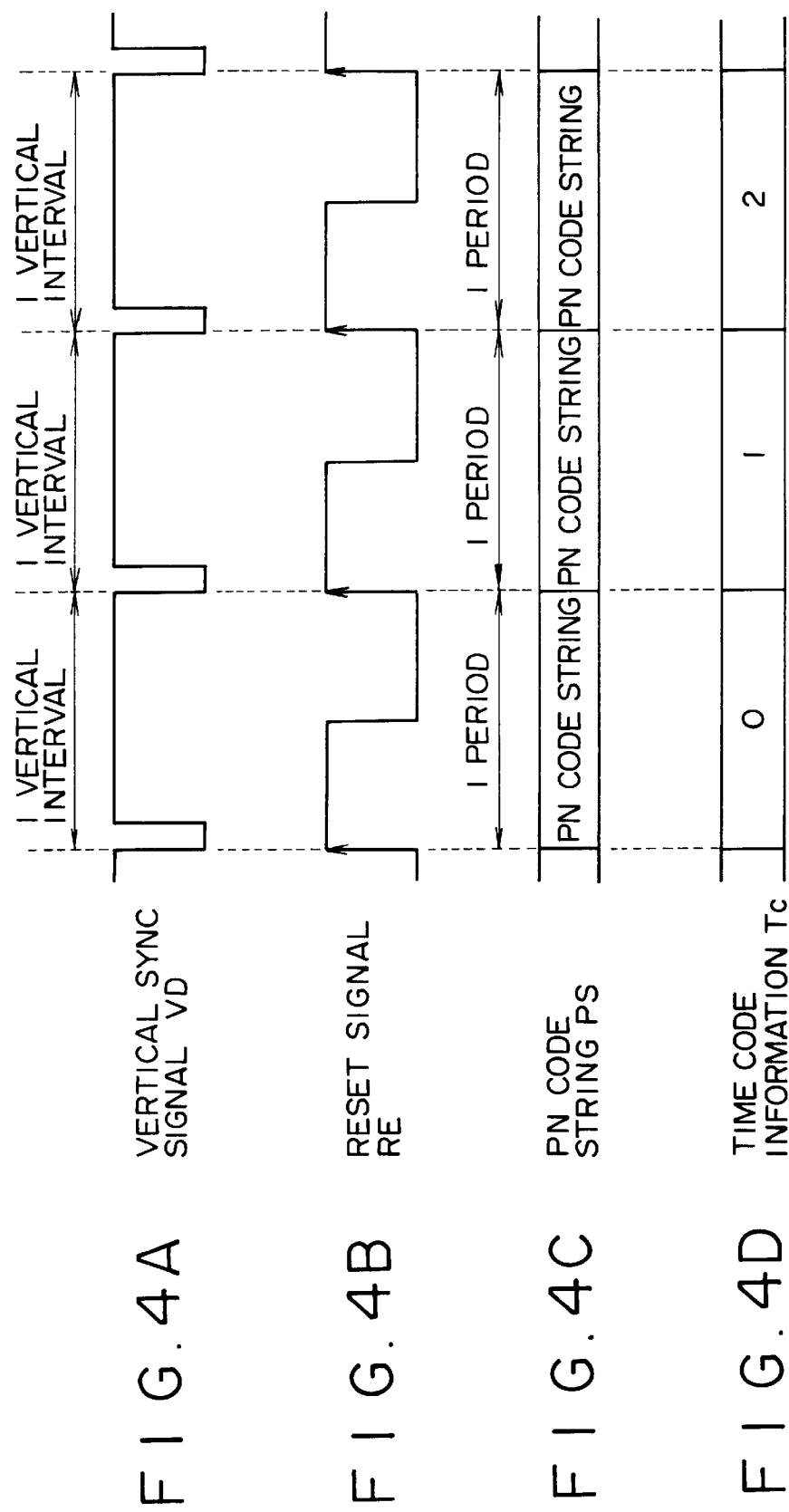
FIG. 4A–FIG. 4D are a time chart for describing operations of the embodiment shown in FIG. 2.

When receiving an input video signal Vi of an analog video signal, the reference timing detection unit 111 extracts the video sync signal as a reference timing signal. In this embodiment, a vertical sync signal VD is used as the reference timing signal, and the reference timing detection unit 111 extracts the vertical sync signal VD (refer to FIG. 4A) from the input video signal Vi, and supplies it to the PLL circuit 112 and the timing signal generation unit 113.

The PLL circuit 112 generates a clock signal CLK synchronous to the vertical sync signal VD. This clock signal CLK is supplied to the timing signal generation unit 113, and it is supplied to the time code spread signal generation unit 12.

The timing signal generation unit 113 generates a reset signal RE (refer to FIG. 4B) of the PN code string for spectrally spreading the time code information Tc and other various timing signals based on the vertical sync signal VD and clock signal CLK, and outputs them to the time code spread signal generation unit 12. The reset signal RE is a sync timing signal of the PN code string used for spectrally spreading the time code information Tc, and in this embodiment, this reset signal RE is generated as a signal which is synchronous to the vertical sync signal VD and has a period of 1 vertical interval.

The time code spread signal generation unit 12 generates a PN (pseudo random noise) code string, and spectrally spreads the time code information Tc using this PN code string.

Figure 5:
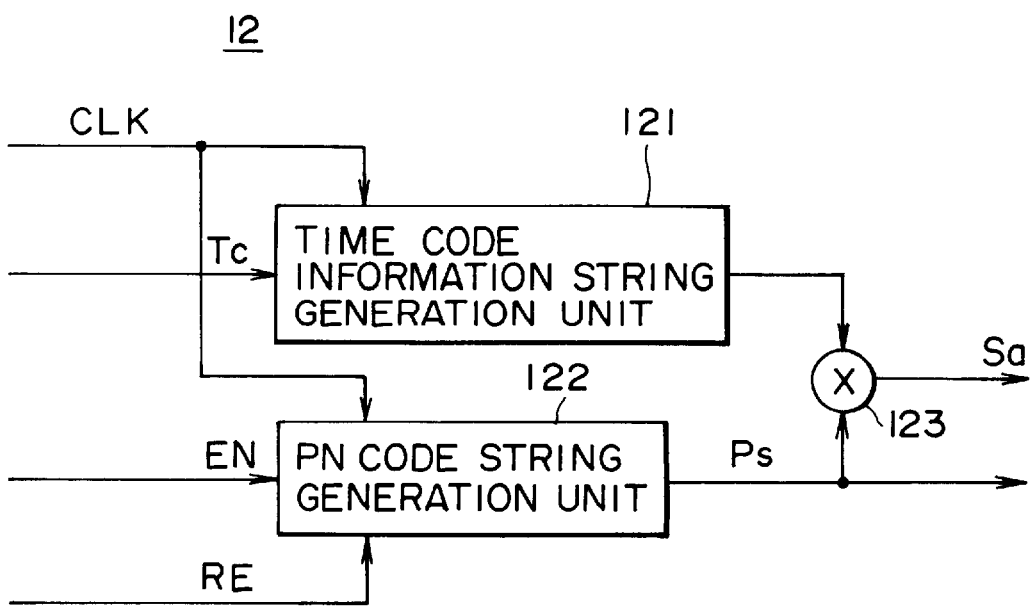
FIG. 5 is a partial block diagram for illustrating a detailed exemplary structure of FIG. 2.

FIG. 5 is a block diagram for illustrating the structural example of the time code spread signal generation unit 12. As shown in this FIG. 5, the time code spread signal generation unit 12 is provided with a time code information string generation unit 121, a PN code string generation unit 122, and a multiplication device 123.

The clock signal CLK and input time code information Tc (refer to FIG. 4D) are supplied to the time code information string generation unit 121. In case of this embodiment, the time code information Tc, though it is not shown in the drawing, is a code information synchronous to the vertical sync signal VD. For purpose of simplified description, in this embodiment, the time code information Tc having the serial field number of "0", "1", "2", . . . is described, however, of course more detailed information may be used as the time code information Tc.

The time code information string generation unit 121 generates a time code information string by outputting the time code information Tc based on the clock CLK, and supplies it to the multiplication device 123.

On the other hand, the clock signal CLK, enable signal EN, and reset signal (initialization signal) RE are supplied to the PN code string generation unit 122. The enable signal EN is a signal to activate the PN code string generation unit 122, in this embodiment, the enable signal EN is generated when a power source is thrown in to the time code information addition device 10, and is supplied to the PN code string generation unit 122. On the other hand, the reset signal RE is a signal to generate a PN code string having a predetermined code pattern from the head.

The PN code string generation unit 122 is activated in response to the enable signal EN. The PN code string generation unit 122 generates a PN code string at the timing of every supply of the reset signal RE from the head, and generates a PN code string PS (refer to FIG. 4C) synchronously to the clock signal CLK. The generated PN code string PS is supplied to the multiplication device 123.

FIG. 6 is a block diagram for illustrating the exemplary structure of the PN code string generation unit 122. The PN code string generation unit 122 of this example comprises, for example, 15 D flip-flop REG1 to REG15 which constitute a 15 step shift register, and exclusive OR circuits EX-OR1 to EX-OR5 for mathematically figuring out a suitable tap output of this shift register. The PN code string generation unit 122 shown in FIG. 6 generates M series of PN code strings PS based on the reset signal RE, clock signal CLK, and enable signal EN as described herein above.

The Multiplication unit 123 spectrally spreads the spread time code information Tc using the PN code string PS supplied from the PN code string generation unit 122. From this multiplication unit 123, the time code spread signal which is the signal that the time code signal is spread spectrally is provided.

The time code spread signal from this time code spread signal generation unit 12 is supplied to the superimposition unit 13. The superimposition unit 13 performs superimposition of this time code spread signal on the input video signal Vi. And then, the superimposition unit 13 outputs the video signal Vo on which the time code spread signal is superimposed. This output video signal Vo is supplied to a monitor television set for displaying a picture or a recording unit for recording the video signal in a recording medium.

Figure 7:
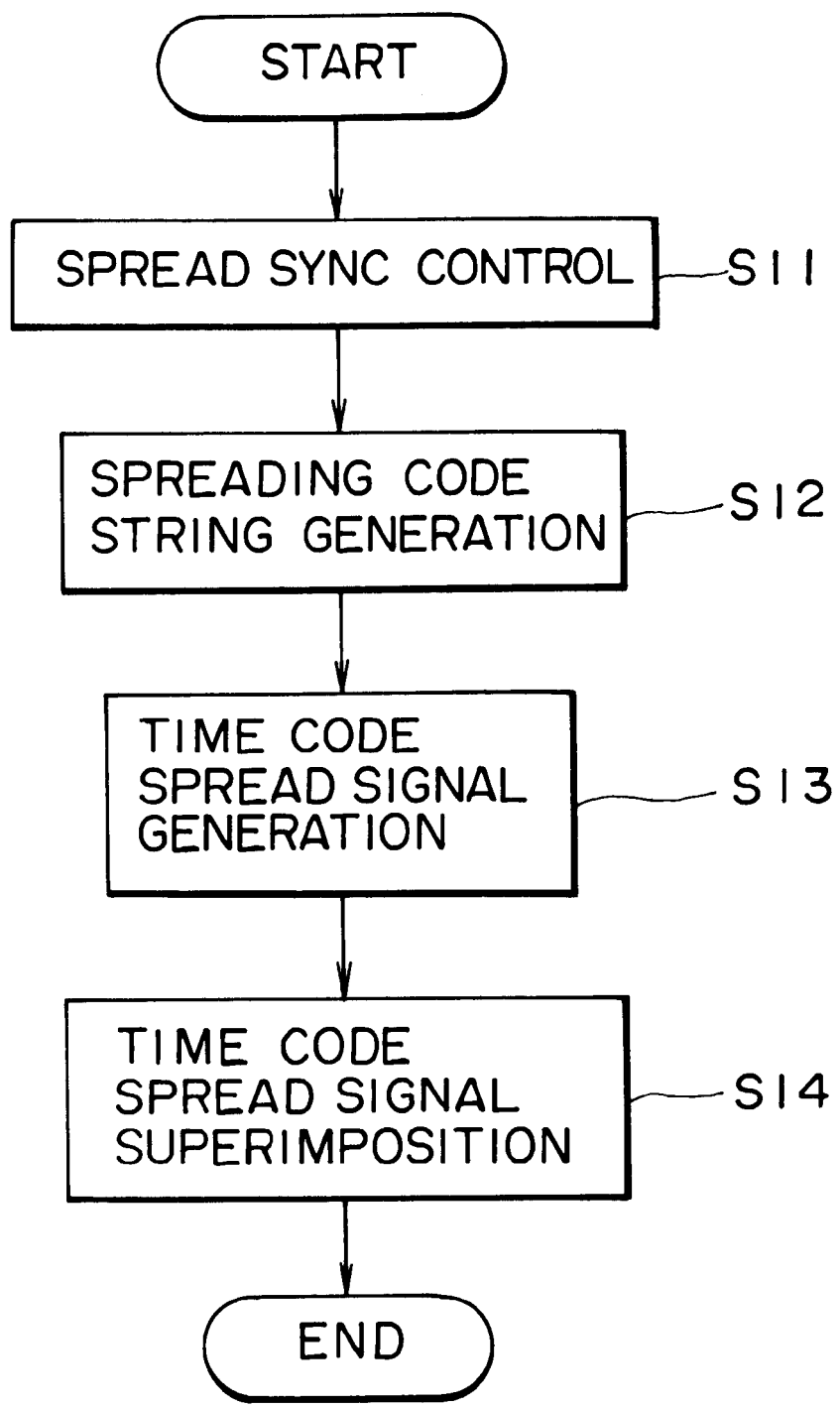
FIG. 7 is a flow chart for describing operations in the embodiment shown in FIG. 2.

A flow of the above-mentioned operation of the time code information addition device 10 is described in FIG. 7. In detail, the first vertical sync signal VD is extracted from the input video signal Vi in the first step S11, and the spread sync control is performed. Next, in the second step S12, a spreading PN code string PS is generated. In the next third step S13, the time code information Tc is spectrally spread using the spreading PN code string PS, and a time code spread signal is generated. In the next fourth step S14, the generated time code spread signal is superimposed on the input video signal Vi.

In this case, as described hereinbefore, the time code spread signal is superimposed on the video signal Vi at a sufficiently low level to obtain a normal picture when the video signal Vo is supplied to a monitor for displaying a picture.

The FIG. 8 describes spectrally the relation between the time code information, the time code spread signal, and the video signal. The time code information includes a little information, is a signal of low bit rate, and is a narrow-band signal as shown in FIG. 8A. Such narrow band signal is converted to a wide band signal as shown in FIG. 8B by performing spectral spread. When, the spectral spread signal level is lowered in inverse proportion to the enlargement ratio of the band.

Figure 8A:
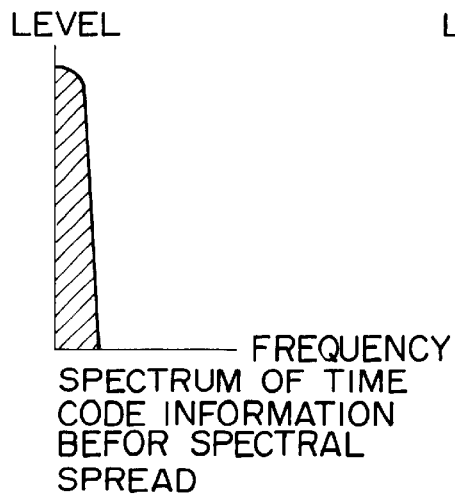
FIG. 8A–FIG. 8D are a diagram for describing the embodiment shown in FIG. 2.
Figure 8B:
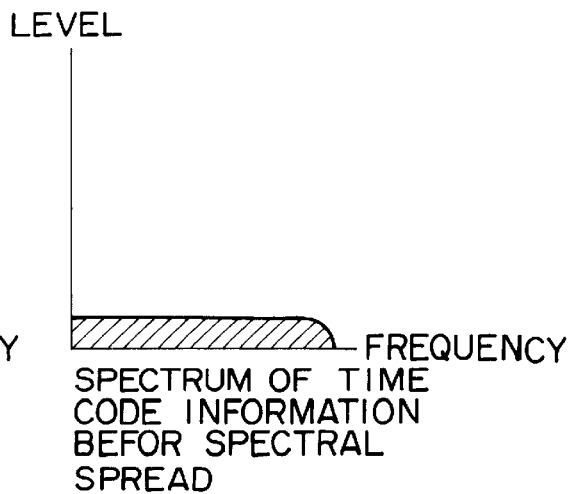
Figure 8C:
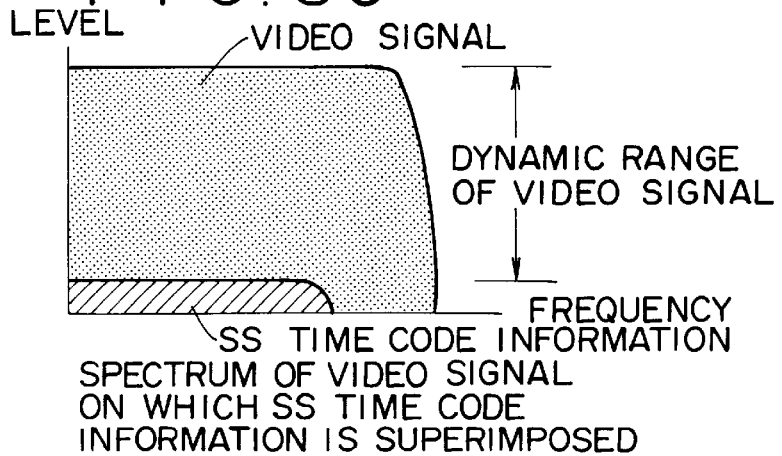

When the superimposition unit 13 superimposes this spectral spread signal namely the time code spread signal on the video signal, the time code spread signal is superimposed at a level lower than that of dynamic range of the video signal as shown in FIG. 8(c). By performing superimposition as described herein above, deterioration of the video signal is avoided. As the result, when the time code spread signal on which the video signal Vo is superimposed is supplied to a monitor television set and a picture is played back, the time code spread signal does not affect the picture quality adversely and the picture of good quality is obtained.

Figure 8D:
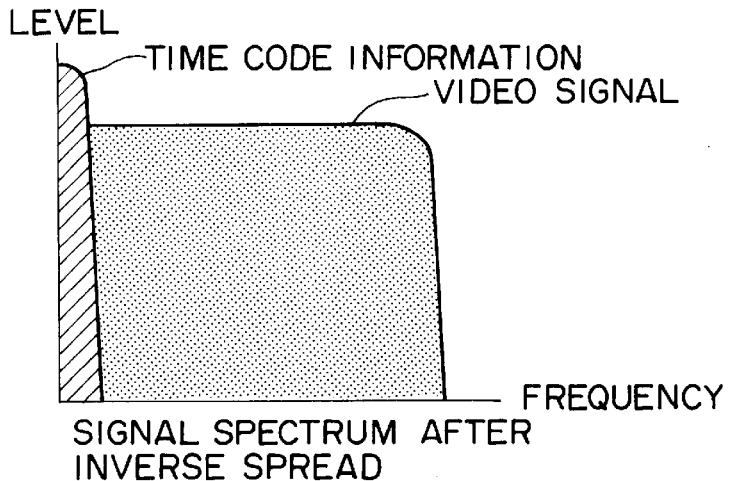

When spectral inverse spread is performed in order to detect the superimposed time code spread signal as described hereinafter, as shown in FIG. 8(d), the time code spread signal is restored as a narrow-band signal again. By providing a sufficiently large band spread ratio, power of the time code information after inverse spread exceeds that of the information signal, and hence the time code information is detected.

In this case, because the code information superimposed on the video signal is superimposed on the same time and same frequency as the video signal, the time code information can not be removed or changed by using a frequency filter or simply replacing information.

Accordingly, it is possible that the time code spread signal superimposed on the video signal is surely supplied to a monitor television set together with the video signal, and the time code information is used for various applications. Hence, the time code information addition device 10 is incorporated in a recording device, and a video signal Vo is recorded in a recording medium such as a tape or disk using this recording device, a recording medium which is capable of specifying pictures of each field is provided.

In the case that the input video signal Vi is a digital video signal, the time code spread signal is superimposed on the digital video signal in the same manner as described herein above with only the exception that the method for detecting the vertical sync of the video signal is different from the method for the analog video signal. In other words, a video signal is processed in field unit generally also in the case of digital video signal, and the head position of a field unit can be identified from the digital video signal. Accordingly the head position of this field unit is extracted as synchronous timing in the case of the digital video signal.

Next, an embodiment of the device for extracting a time code spread signal superimposed on a video signal as described herein above and for detecting the time code information is described.

Figure 9:
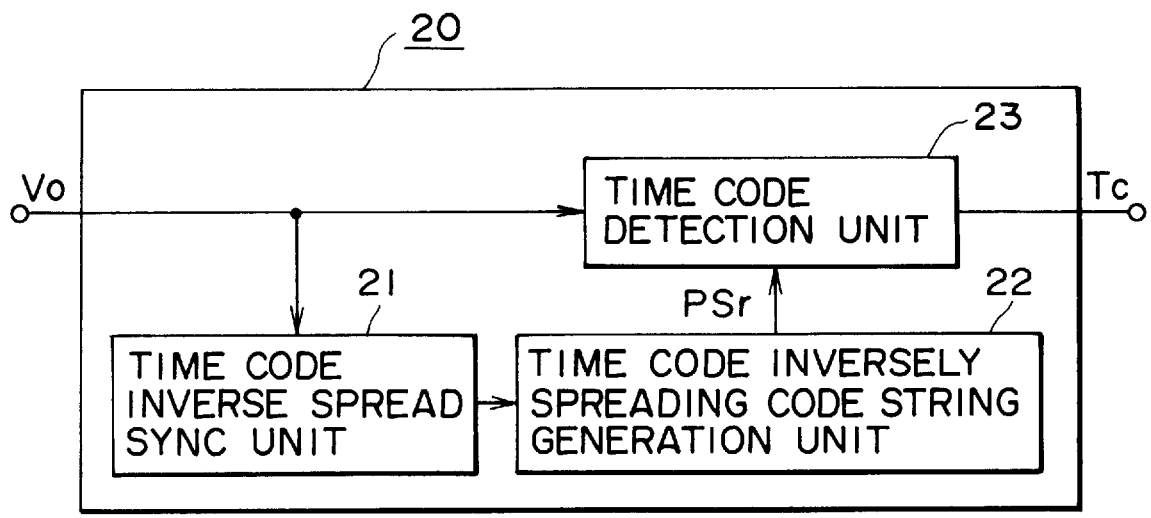
FIG. 9 is a block diagram for illustrating an embodiment of a time code information detection device in accordance with the present invention.

FIG. 9 is a block diagram for illustrating the structure of the time code in formation detection device 20 of this embodiment, and the time code information detection device 20 comprises a time code inverse spread sync unit 21, a time code inversely spreading code string generation unit 22, and a time code detection unit 23. A video signal Vo on which a time code spread signal is superimposed is inputted to the detection device 20, and then supplied to the time code inverse spread sync unit 21 and time code detection unit 23.

The time code inverse spread sync unit 21 is structured in the same manner as the time code spread sync unit 11 of the time code information addition device 10 mentioned above, in the case of analog video signal, the time code inverse spread sync unit 21 generates a timing signal RE and clock signal CLK which are synchronous to the vertical sync signal VD included in the video signal Vo, and supplies them to the time code inversely spreading code string generation unit 22.

Time code inversely spreading code string generation unit 22 has the quite same structure as the PN code string generation unit 122 of the time code spread signal generation unit 12 of the time code information addition device 10 described hereinbefore, and generates a PN code string PSr which is synchronous to the vertical sync signal VD of the video signal Vo as an inversely spreading PN code string. This PN code string PSr is synchronous to the spectrally spreading PN code string PS of the time code information addition device 10, and supplied to the time code detection unit 23.

The time code detection unit 23 performs inverse spread processing on the video signal Vo using the inversely spreading PN code string PSr. Because PN code string PSr is the same code string which is synchronous to the spectrally spreading PN code string PS of the time code information addition device 10 as mentioned above, the time code information Tc superimposed on the video signal Vo is detected by this inverse spread processing. The detected time code information Tc is outputted for various applications.

Figure 10:
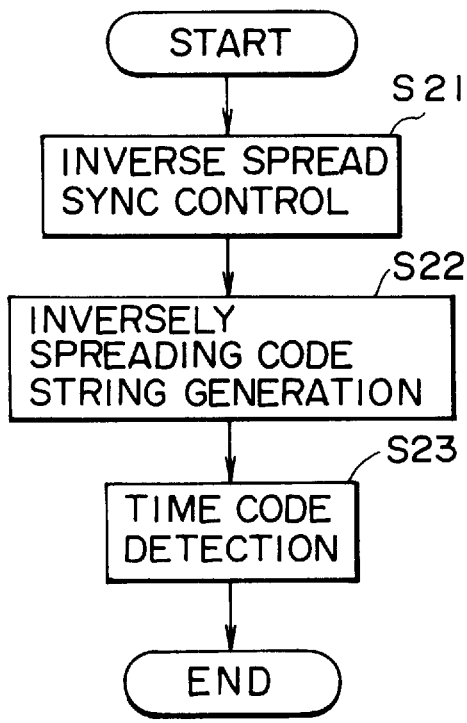
FIG. 10 is a flow diagram for describing operations in the embodiment shown in FIG. 9.

A flow of operation of the time code information detection device 20 is illustrated in FIG. 10.

In detail, first in the first step S21, the vertical sync signal VD is extracted from the video signal Vo, and synchronous control to acquire an inversely spreading code are performed. Next, in the second step S22, an inversely spreading PN code string PSr is generated. In the next third step S23, inverse spectral spread is performed using this inversely spreading PN code string PSr, and the time code information Tc is detected.

The time code information Tc detected as described herein above is used, for example, for editing records, and other various applications. Information obtained based on the time code information Tc may be displayed on a monitor television set.

In the above-mentioned example, the case that the time code information Tc is the information which changes monotonously from the head of the video signal to the tail field has been described, however, other embodiments of the time code, for example, information which repeats from "0" to "9" every plurality of fields such as 10 fields may be used. Such repeating information is particularly effective for a case in which video signals are grouped in a unit of a plurality of fields.

Alternatively, a case that, for example, one number is given to a plurality of fields and the time code is changed every plurality of fields may be used.

The time code information addition device 10 described herein above is provided to a playback system, and the time code information detection device 20 is provided to the edition recording system side, thereby, an edition system which is capable of performing edition work while each field is being recognized can be realized.

Because the field position in a video signal can be specified by spectrally spreading the time code information Tc and superimposing it on the video signal as described herein above, the spread sync timing which is used when an additional information such as an anti-duplication control signal is spectrally spread over a plurality of fields using the time code spread signal and superimposed on the video signal is specified. Some embodiments of such information addition device for adding a video signal are described herein under.

Figure 11:
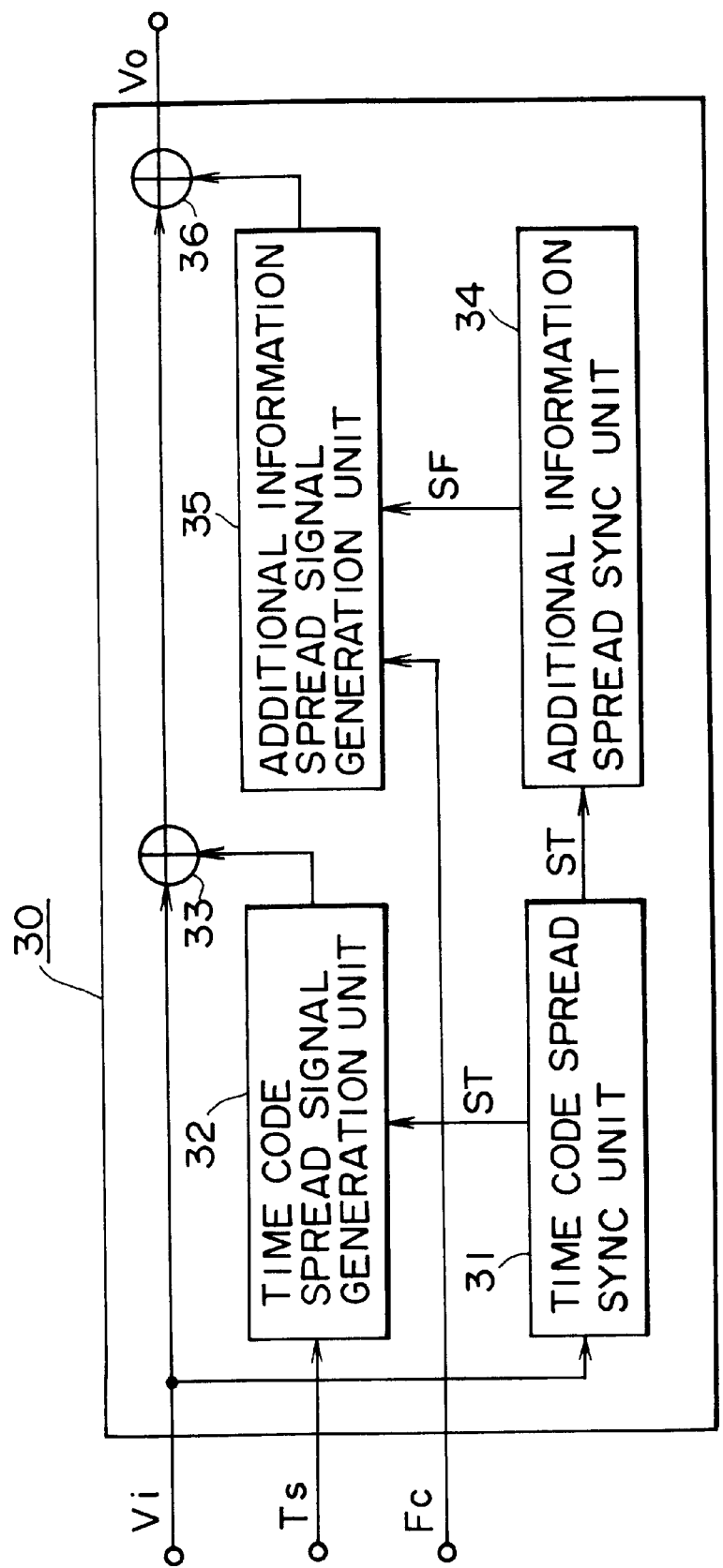
FIG. 11 is a block diagram for illustrating the first embodiment of an information addition device in accordance with the present invention.

FIG. 11 is a block diagram for illustrating an exemplary structure of the information addition device 30 of the first embodiment. In detail, this information addition device 30 comprises a time code spread sync unit 31, a time code spread signal generation unit 32, a time code spread signal superimposition unit 33, an additional information spread sync unit 34, an additional information spread signal generation unit 35, and an additional information spread signal superimposition unit 36.

Though the time code spread sync unit 31 is structured in the same manner as the time code spread sync unit 11 shown in the above-mentioned FIG. 2, in this information addition device 30, a signal having a period a plurality of times, for example three times, that of the vertical sync signal VD (refer to FIG. 12A) of the input video signal Vi is used as the time code spread sync signal ST (refer to FIG. 12B). This time code spread sync signal ST is equivalent to the above-mentioned reset signal RE. In the case of this information addition device 30, the time code information Tc is the information which is synchronous to the vertical sync signal VD and varies every 3 vertical periods as shown in FIG. 12C.

Though the time code spread signal generation unit 32 has the same structure as that shown in FIG. 5, because, the time code spread sync signal ST in this embodiment is a signal of 3 vertical periods, a code string PN1 of 3 vertical periods is generated as the time code spreading PN code string as shown in FIG. 12D, and the time code information Tc is spectrally spread using this PN code string PN1, and thus a time code spread signal is generated.

The time code spread signal superimposition unit 33 has the quite same structure as the above-mentioned superimposition unit 13, and superimposes the time code spread signal on the input video signal Vi.

Next, the additional information spread sync unit 34 generates an additional information spread sync signal SF from the time code spread sync signal ST supplied from the time code spread sync unit 31. In this embodiment, a signal which is the quite same as the time code spread sync signal ST shown in FIG. 12B is used as the additional information spread sync signal SF. This additional information spread sync signal SF is supplied to the additional information spread signal generation unit 35.

The additional information spread signal generation unit 35 has the quite same structure as the time code spread signal generation unit 12 shown in FIG. 5. However, in the additional information spread signal generation unit 35, the time code information string generation unit 121 is used instead of the additional information generation unit, and the PN code string generation unit 122 generates a PN code string namely code string PN2 (refer to FIG. 12E) which is different from the PN code string PN1 of the time code spread signal generation unit 32. Any one of two methods for generating the different code string, namely a method that a plurality of PN code string generation units for generating quite different code systems is provided and a method in which reset timing of a single PN code string generation unit is changed, may be used.

In this embodiment, an additional information Fc having the control content, for example, of duplication permission, duplication inhibition, or duplication generation limitation is supplied to the additional information spread signal generation unit 35. The additional information spread signal generation unit 35 multiplies the additional information by the PN code string PN2 generated synchronously to the additional information spread sync signal SF as described herein above, and generates the additional information spread signal namely the spectrally spread additional information as the multiplication output.

The additional information spread signal generated from the additional information spread signal generation unit 35 is supplied to the additional information spread signal superimposition unit 36. The superimposition unit 36 superimposes the additional information spread signal on the video signal Vi on which the time code spread signal is superimposed already. The superimposition unit 36 outputs the output video signal Vo on which both time code spread signal and additional information spread signal are superimposed already.

A flow of operation in the information addition device 30 is shown in FIG. 13. In detail, first in the step S31, the vertical sync signal VD is extracted from the input video signal Vi for performing time code spread sync detection. The step for generating an time code spread signal using the detected time code spread sync signal ST and the step for generating an additional information spread signal both proceed in parallel.

In detail, in the process for generating a time code spread signal, a time code spreading PN code string PN1 is generated synchronously to the time code spread sync signal ST in the second step S32. Next, in the third step S33, the time code information Tc as shown in FIG. 12C is spectrally spread using the spreading PN code string PN1 to generate a time code spread signal. Subsequently in the next fourth step S34, the generated time code spread signal is superimposed on the input video signal Vi.

Further in the process for generating an additional information spread signal, an additional information spread sync signal SF which is synchronous to the time code spread sync signal ST is generated in the fifth step S35, and in the subsequent sixth step S36, an additional information spreading PN code string PN2 is generated synchronously to the additional information spread sync signal SF. Next, in the seventh step S37, the additional information Fc is spectrally spread using the additional information spreading PN code string PN2 to generate an additional information spread signal. Subsequently, in the eighth step S38, the generated additional information spread signal is superimposed on the input video signal Vi.

The time code spread signal and additional information spread signal may be superimposed simultaneously as shown in FIG. 13, or the additional information spread signal may be superimposed after the time code spread signal is superimposed as shown in FIG. 11. Alternatively, the time code spread signal may be superimposed after the additional information spread signal is superimposed. The same is true for embodiments described hereinafter.

In the process of spectral spread and superimposition of both time code information and additional information on the video signal, the superimposition level of both spread signals is controlled to a sufficiently low level so that the video signal is not deteriorated.

As described herein above, in this embodiment, the additional information is spectrally spread over 3 fields and superimposed on the video signal Vi, and because the additional information spread signal is synchronous to the time code information, it is easy to synchronize when the additional information spread signal is inversely spread over 3 fields by restoring the time code information. In other words, it is easy to inversely spread and extract the additional information in spite of spectral spread and superimposition of the additional information on the video signal over 3 fields. In the example of FIG. 12, by using the transition between time code information Tc as the inversely spreading sync timing of the additional information spread signal, inverse spread becomes easy.

In the example shown in FIG. 12, the time code information Fc is a value which varies every 3 fields synchronous to it for spectral spread of the additional information over 3 fields, but alternatively, as shown in FIG. 14, the time code information Fc that different values are assigned to each field of the involved 3 fields may be used so that each field of the three fields for spectrally spreading the additional information is identified.

In this case, the time code sync signal ST is a signal of 1 vertical period (1 field period) as shown in FIG. 14B. The sync timing of inverse spread of the additional information spread signal is detected easily by detecting a turning point of the time code repeating every 3 fields.

The information addition device 30 described herein above is incorporated in a recording device, and the video signal Vo is recorded in a recording medium such as a tape or disk, thus the recording medium in which the video information having the additional information such as an anti-duplication control information spectrally spread and superimposed thereon is recorded in the condition that sync is detected using the time code is thereby provided.

Figure 16:
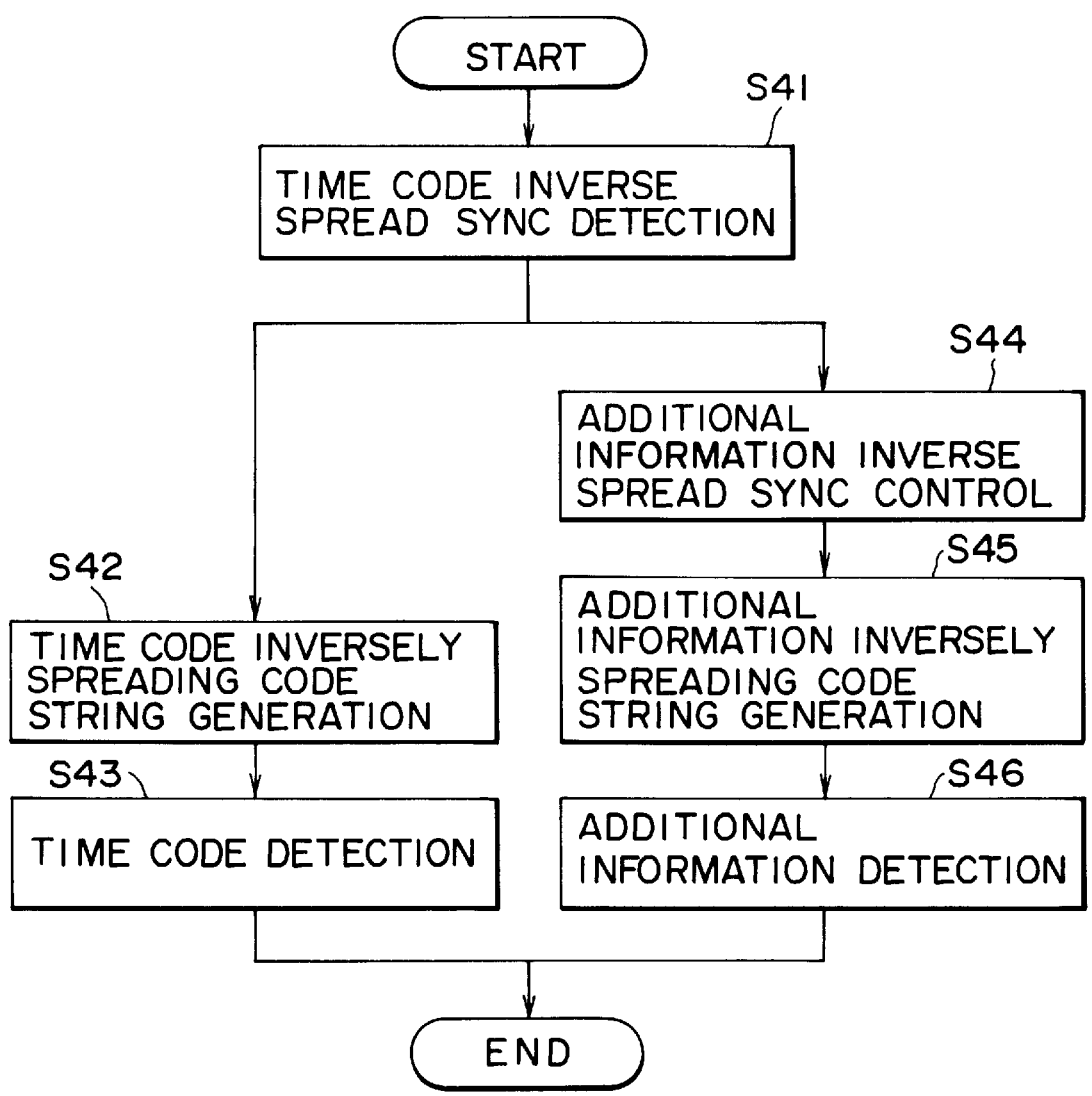
FIG. 16 is a flow chart for describing operations in the first embodiment shown in FIG. 15.

FIG. 15 shows the first embodiment of to additional information detection device 40 for detecting the time code information and additional information added by the information addition device 30 described with reference to FIGS. 11 to 13. FIG. 16 is a flow chart for describing a flow in the additional information detection device 40 shown in FIG. 15.

The additional information detection device 40 of this first embodiment is provided with a time code inverse spread sync unit 41, a time code inversely spreading code string generation unit 42, a time code detection unit 43, an additional information inverse spread sync unit 44, an additional information inversely spreading code string generation unit 45, and an additional information detection unit 46.

The time code inverse spread sync unit 41, time code inversely spreading code string generation unit 42, and time code detection unit 43 respectively have the same structure as the time code inverse spread sync unit 21, time code inversely spreading code string generation unit 22, and time code detection unit 23 shown in FIG. 9 excepting that the time code is numerical data which changes with a period of 3 fields and the time code inverse spread sync signal has a period of 3 fields.

As described herein above, the time code information Tc superimposed on the video signal Vo is extracted and outputted by inverse spread, when, the detection result obtained by the time code detection unit 43 is fed back to the time code inverse spread sync unit 41, the time code inverse spread sync is detected at the time point when the time code information Tc is detected correctly for detecting inverse spread sync having a period of 3 fields.

Steps S41 to S43 in the operation flow of FIG. 16 shows detection operation for detecting the time code information Tc.

When the time code inverse spread sync signal is detected, the additional information inverse spread sync unit 44 controls inverse spread sync of the additional information using the detected time code inverse spread sync signal. The additional information inverse spread sync signal obtained by sync control is supplied to the additional information inversely spreading code string generation unit 45, and an additional information inversely spreading PN code string PN2 is thereby generated. The generated additional information inversely spreading PN code string PN2 is supplied to the additional information detection unit 46, the video signal Vo is subjected to inverse spectral spread processing, and the additional information Fc is detected. The detected additional information Fc is outputted for recording control.

Steps S44 to S46 shown in the operation flow of FIG. 16 shows the detection operation of the additional information Fc.

In the example shown in FIG. 14, because the time code spread sync has a period of 1 field, it is not necessary to feed back the output from the time code detection unit 43 to the time code inverse spread sync unit 41 to detect the time code inverse spread sync signal as shown in FIG. 15. However, in this case, the time code detection output of the time code detection unit 43 is supplied to the additional information inverse spread sync unit 44, and the additional information inverse spread sync unit 44 detects the additional information inverse spread sync signal from the time code inverse spread sync signal having a period of 1 field supplied from the time code inverse spread sync unit 41 and the repeated timing of the time code having a period of 3 fields.

In the example shown in FIG. 14, each field in a period of 3 fields can be identified, therefore even if the field order is disordered, the disorder is detected easily. Even if a person who wants to duplicate illegally changes the field order, the additional information is detected regardless of the changed order. Alternatively, the changed field order is detected as an illegal processing.

The additional information detection device 40 described herein above is incorporated in a recording device, and a detected additional information Fc for example an anti-duplication control signal is used, duplication prevention control is thereby performed surely. In this case, the above-mentioned information addition device 30 is incorporated in a recording device, and the video signal Vo from the playback device is supplied to the recording device having the additional information detection device 40, and by using such system structure, more consistent duplication prevention control is performed.

Figure 17:
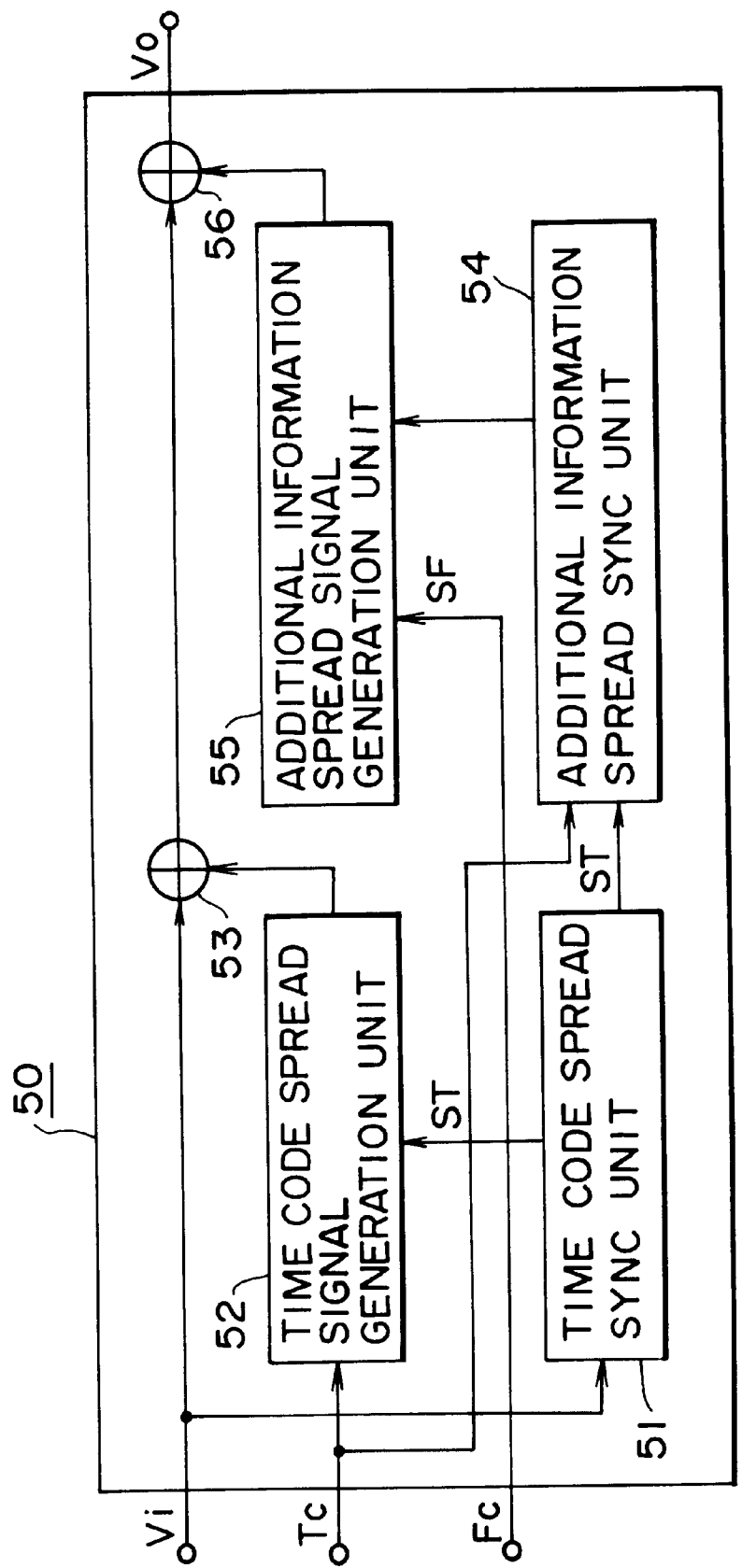
FIG. 17 is a block diagram for illustrating the second embodiment of the information addition device in accordance with the present invention.
Figure 18:
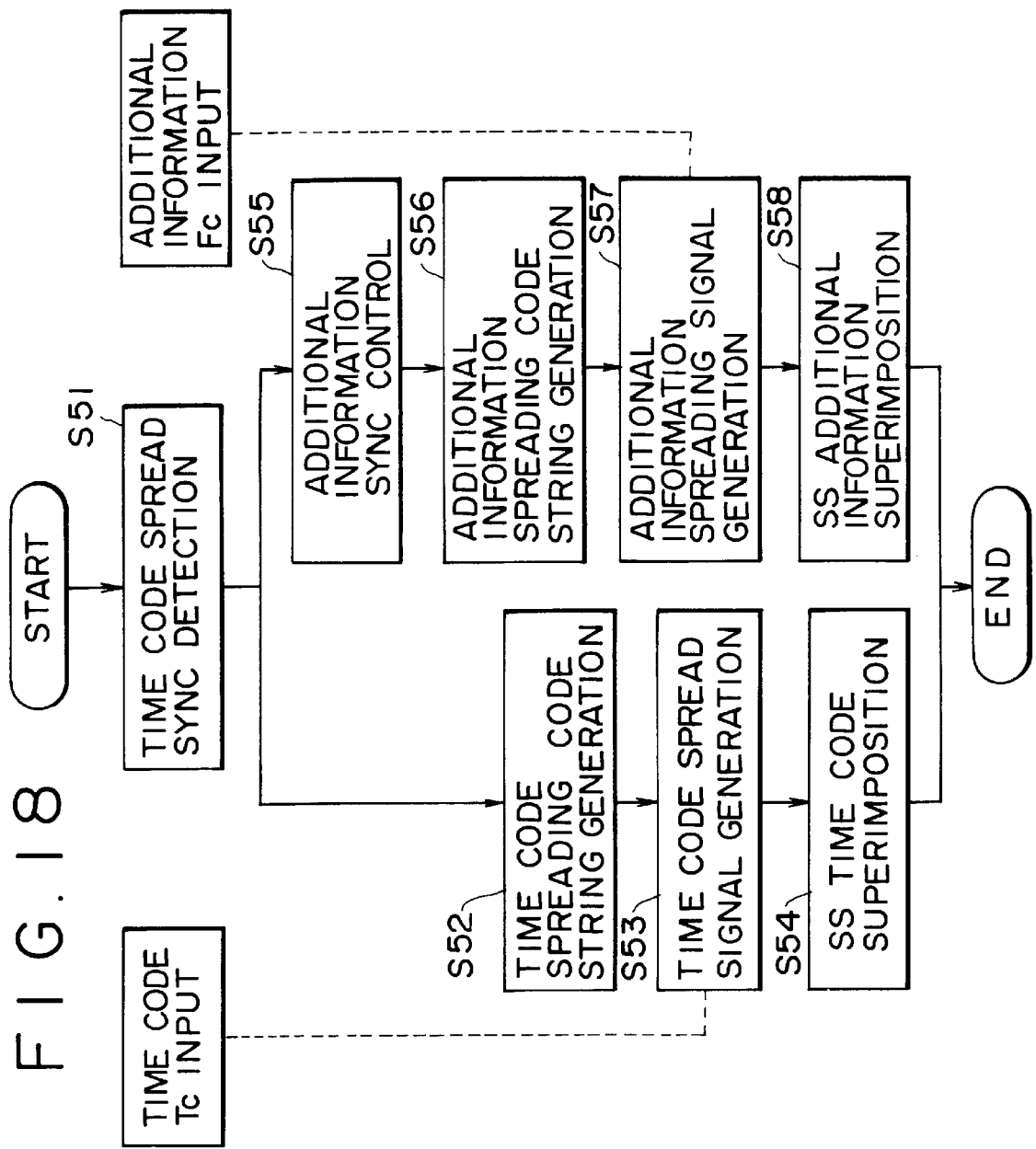
FIG. 18 is a flow chart for describing operations in the second embodiment shown in FIG. 17.

FIG. 17 is a block diagram for illustrating an exemplary structure of an information addition device 50 of the second embodiment. FIG. 18 is a diagram for describing a flow in the information addition device 50. As shown in FIG. 17, the information addition device 50 of the second embodiment comprises a time code spread sync unit 51, a time code spread signal generation unit 52, a time code spread signal superimposition unit 53, an additional information spread sync unit 54, an additional information spread signal generation unit 55, and an additional information spread signal superimposition unit 56.

The block structure of the information addition device 50 has the same block structure comprising the same structural block components as the above-mentioned information addition device 30 of the first embodiment shown in FIG. 11 excepting that the information addition device 50 of the second embodiment is structured so that the time code information Tc is supplied to the additional information spread sync unit 54 and then the additional information spread sync signal SF is changed correspondingly to the time code information Tc.

In detail, the time code spread sync unit 51 has the same structure as the above-mentioned time code spread sync unit 11 shown in FIG. 2 excepting that a signal having a period three times one period of the vertical sync signal VD (refer to FIG. 19A) of the input video signal Vi is used as the time code spread sync signal ST (refer to FIG. 19B). The time code spread sync signal ST corresponds to the above-mentioned reset signal RE. The information addition device 50 involves the time cord information Tc which varies every 3 vertical periods synchronously to the vertical sync signal as shown in FIG. 19C.

Though the time code spread signal generation unit 52 has the same structure as that shown in FIG. 5, in this embodiment, because the time code spread sync signal ST is a signal having a period of 3 vertical periods, a code string PN1 of 3 vertical periods is generated as the time code spreading PN code string as shown in FIG. 15D, the time code information Tc is spectrally spread using the PN code string PN1 and a time code spread signal is generated.

The time code spread signal superimposition unit 53 has the quite same structure as the above-mentioned superimposition unit 13, and superimposes the time code spread signal on the input video signal Vi.

Next, the additional information spread sync unit 54 generates an additional information spread sync signal SF from the time code spread sync signal ST supplied from the time code spread sync unit 51 and from the time code information Tc. In this embodiment, the additional information spread sync signal SF is a signal having the same period as that of the time code spread sync signal ST as shown in FIG. 19E if the time code information Tc shown in FIG. 19C has an even number (0 is included in the even number), on the other hand, the additional information spread sync signal SF is a signal having a period, for example, two times that of the time code spread sync signal ST if the time code Tc is an odd number. In other words, the period of the additional information spread sync signal SF is changed correspondingly to the value of the time code Tc. The additional information spread sync unit 54 supplies the generated additional information spread sync signal SF to the additional information spread signal generation unit 55.

The additional information spread signal generation unit 55 has the same structure as the additional information spread signal generation unit 35 shown in FIG. 11. However, the additional information spreading PN code string is a PN code string PN2 having a period of 3 fields if the time code information Tc is an even number, on the other hand, the additional information spreading PN code string is a PN code string having a period of 6 fields as shown in FIG. 19F because the additional information spread sync signal SF is changed as shown in FIG. 19E correspondingly to the time code information Tc in the additional information spread signal generation unit 55.

The additional information spread signal generation unit 55 multiplies the additional information Fc by the PN code string PN2 and PN2d generated synchronously to the additional information spread sync signal SF as described herein above, and generates a spectrally spread additional information namely an additional information spread signal as the multiplication output.

The additional information spread signal generated by the additional information spread signal generation unit 55 is supplied to the additional information spread signal superimposition unit 56. The superimposition unit 56 superimposes the additional information spread signal on the video signal Vi. Then, the superimposition unit 56 outputs the output video signal Vo on which the time code spread signal an d the additional information spread signal are both superimposed.

Steps S51 to S54 shown in FIG. 18 show operations of generation and superimposition of the time code spread signal in the second embodiment. The step S51 and steps S55 to S58 shown in FIG. 18 show operations of generation and superimposition of the additional information spread signal.

In the second embodiment like the first embodiment, the additional information is spectrally spread over a plurality of fields, and the additional information spread sync signal SF is varied correspondingly to the time code information Tc, thereby illegal alteration processing becomes more difficult if the additional information is secret information such as an anti-duplication control signal.

The information addition device 50 described herein above is incorporated in a recording device, and the video signal Vo is recorded in a recording medium such as a tape or disk using the recording device, thus the recording medium on which the video signal having the additional information such as an anti-duplication control signal spectrally spread over a plurality of fields and superimposed thereon is recorded in the condition that sync is detected using the time code is provided.

Figure 19:
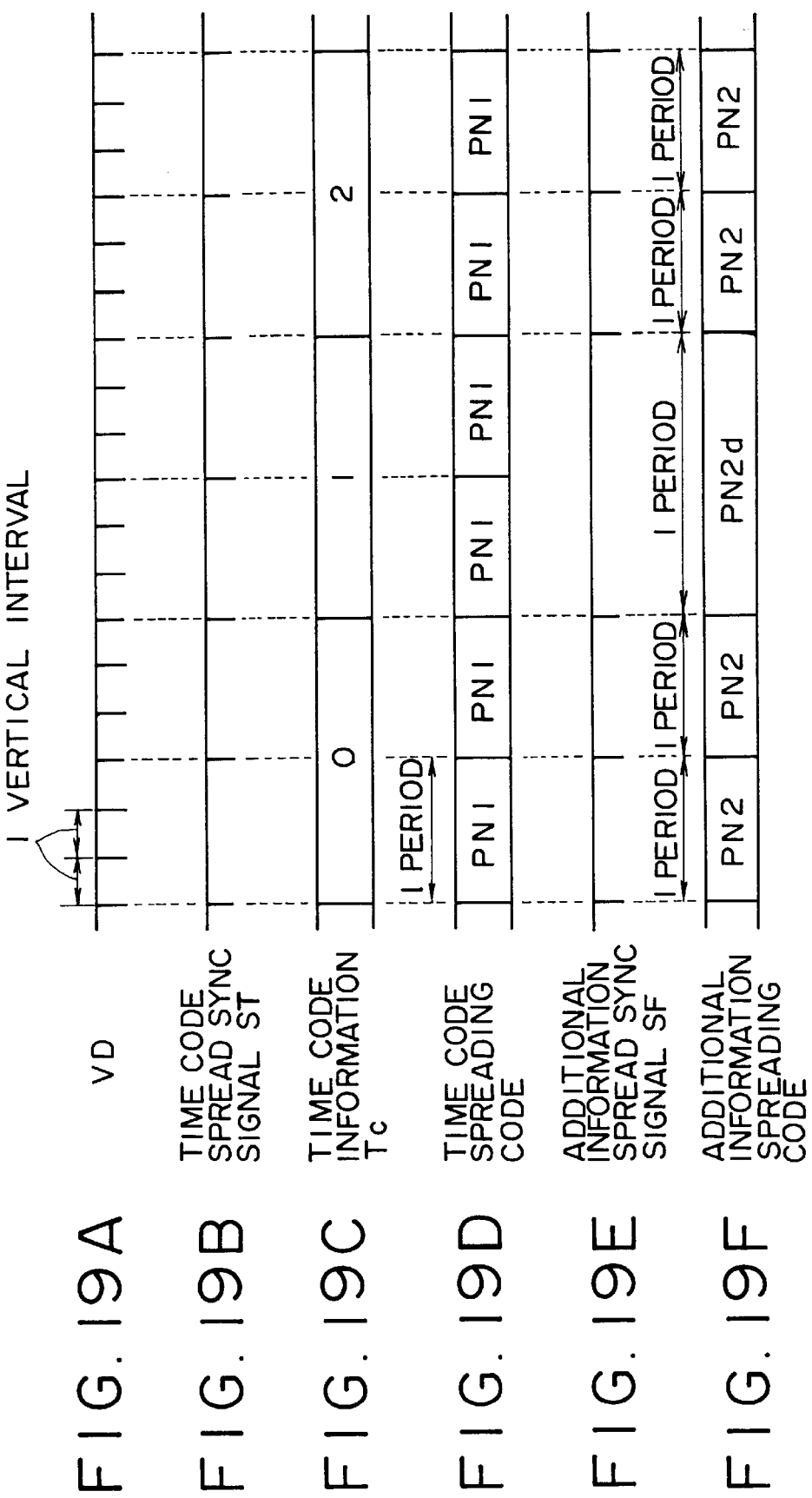
FIG. 19A–FIG. 19F are a flow chart for describing operations in the second embodiment shown in FIG. 17.
Figure 20:
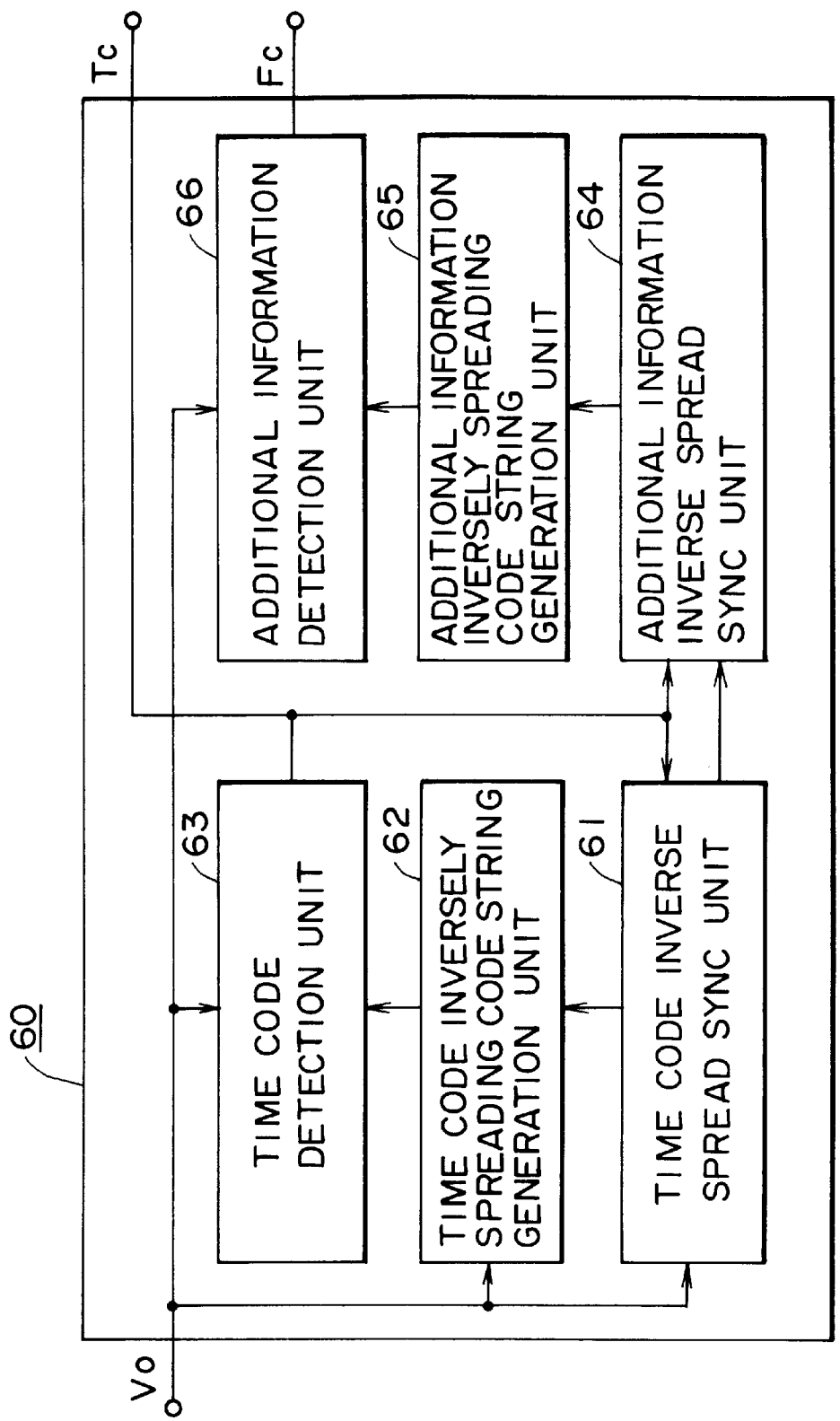
FIG. 20 is a block diagram for illustrating the second embodiment of the additional information detection device in accordance with the present invention.
Figure 21:
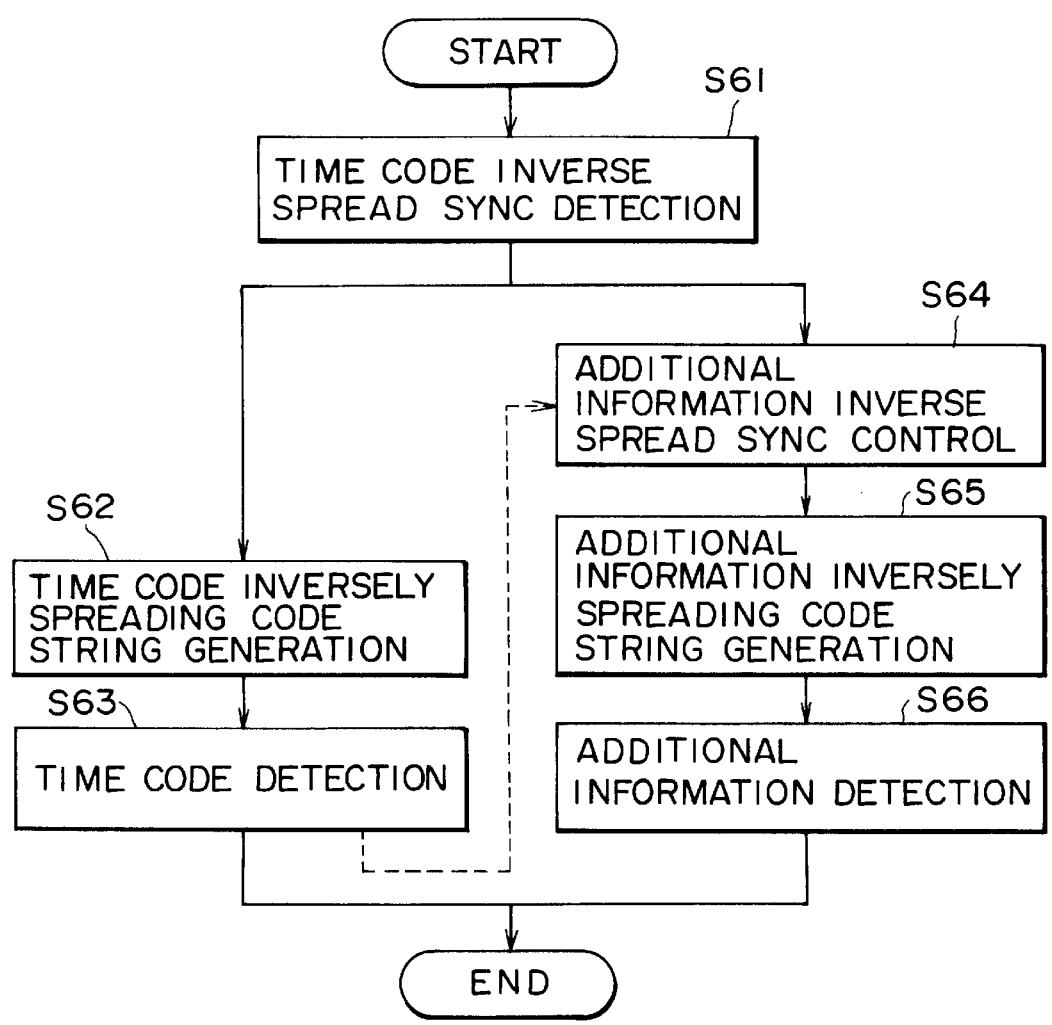
FIG. 21 is a flow chart for describing operations in the second embodiment shown in FIG. 20.

FIG. 20 is a block diagram for illustrating the structure of the additional information detection device 60 of the second embodiment for extracting from the video signal Vo and detecting the time code information and additional information superimposed on the video signal using the information addition device 50 of the second embodiment described with reference to FIGS. 17 to 19. The FIG. 21 is a diagram for describing a flow in the additional information detection device 60.

The additional information detection device 60 of the second embodiment is provided with a time code inverse spread sync unit 61, a time code inversely spreading code string generation unit 62, a time code detection unit 63, an additional information inverse spread sync unit 64, an additional information inversely spreading code string generation unit 65, and an additional information detection unit 66.

The additional information detection device 60 has the same block structure comprising the same structural components as the above-mentioned additional information detection device 40 of the first embodiment described with reference to FIG. 15 with the exception that the additional information detection device 60 is structured so that the time code information Tc detected by the time code detection unit 63 is supplied to the additional information inverse spread sync unit 64 and an additional information inverse spread sync signal SF is generated based on the time code information Tc.

In detail, the structure comprising the time code inverse spread sync unit 61, time code inversely spreading code string generation unit 62, and time code detection unit 63 detects the time code information Tc from the video signal Vo in the quite same operation as the structure comprising the time code inverse spread sync unit 41, time code inversely spreading code string generation unit 42, and time code detection unit 43. Steps S61 to S63 show operations for detecting the time code information Tc in a flow of operations shown in FIG. 21.

When the time code inverse spread sync signal is detected by the time code inverse spread sync unit 61 and the time code information Tc is detected by the time code detection unit 63 as described herein above, the additional information inverse spread sync unit 64 generates an additional information inverse spread sync signal from the time code inverse spread sync signal and time code information Tc. The generated additional information inverse spread sync signal is supplied to the additional information inversely spreading code string generation unit 65, and additional information inversely spreading PN code string PN2 and PN2d are generated from the additional information inverse spread sync signal. The generated additional information inversely spreading PN code string is supplied to the additional information detection unit 66, and inverse spectral spread is performed on the video signal Vo, and the additional information Fc is detected. The detected additional information Fc is outputted for recording control.

Steps S61 to S66 in a flow chart for describing operations in FIG. 21 show operation for detecting the additional information Fc.

In the second embodiment, the time code spread signal is generated by spectrally spreading the time code information Tc having a period of 6 vertical periods using the PN code string PN1 which repeats with a period of 3 vertical periods synchronously to the time code spread sync signal which is a signal having a period of 3 vertical periods, alternatively a signal having a period of 6 vertical periods synchronous to the time code information Tc is used as the time code spread sync signal ST and the time code information Tc may be spectrally spread using the PN code string which repeats with a period of 6 vertical periods.

In this case, the time code spread sync unit 51 generates a signal having a period of 3 vertical periods synchronous to the involved time code spread sync signal having a period of 6 vertical periods using the vertical sync signal VD detected from the input video signal Vi, and the signal having a period of 3 vertical periods is supplied to the additional information spread sync unit 54.

The time code spread sync signal detected by the time code inverse spread sync unit 61 of the additional information detection unit 60 is a signal having a period of 6 vertical periods, the time code inverse spread sync unit 61 generates a signal of 3 vertical periods using the vertical sync signal VD extracted from the video signal Vo and supplies the signal of 3 vertical periods to the additional information inverse spread sync unit 64.

In the description of the above-mentioned second embodiment, the case that the period of the additional information spread sync signal is differentiated correspondingly to the even and odd number of the time code information Tc value, however the present invention is by no means limited to the case, alternatively the period of the additional information spread sync signal may be different correspondingly to the value of the respective time code information Tc.

Figure 22:
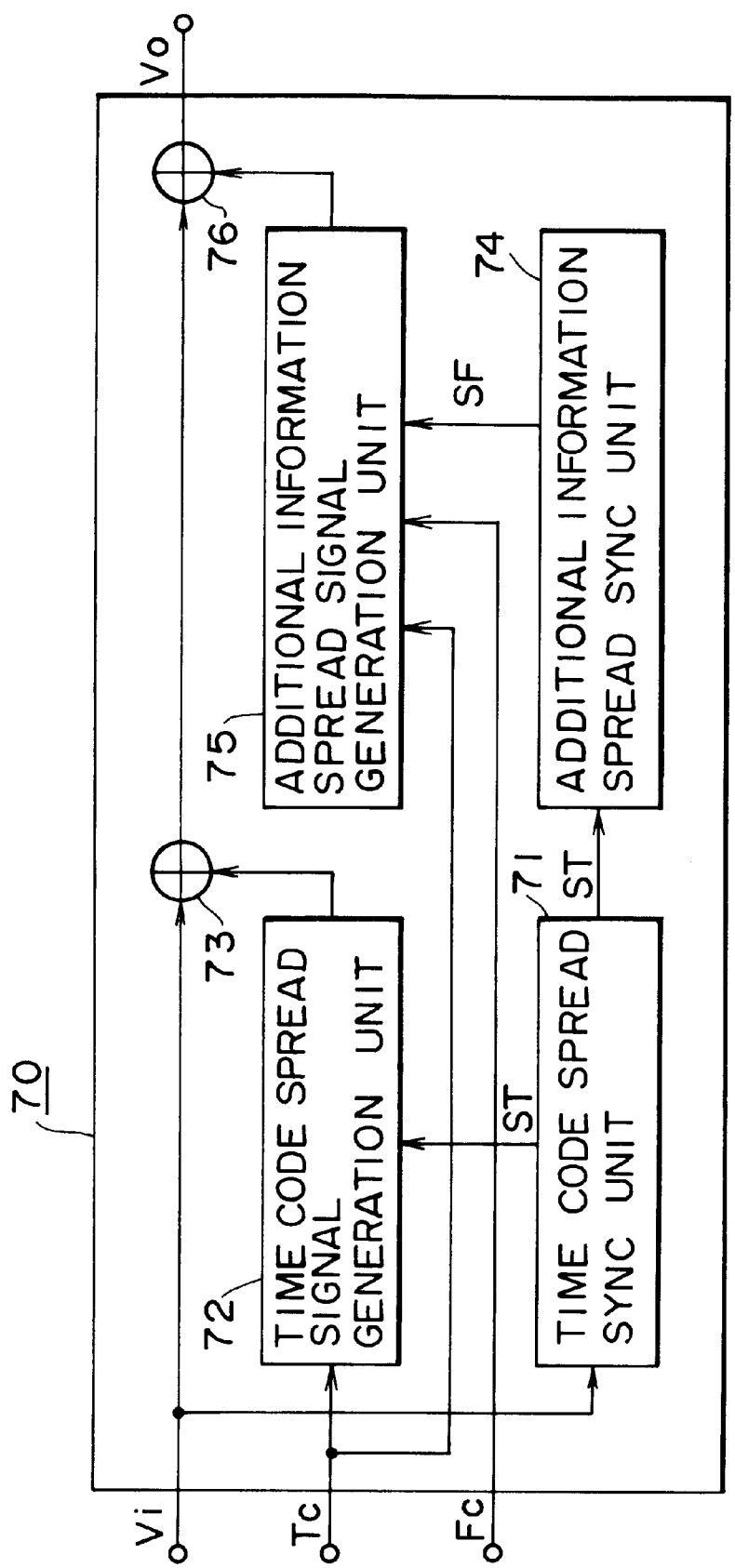
FIG. 22 is a block diagram for illustrating the third embodiment of the information addition device in accordance with the present invention.
Figure 23:
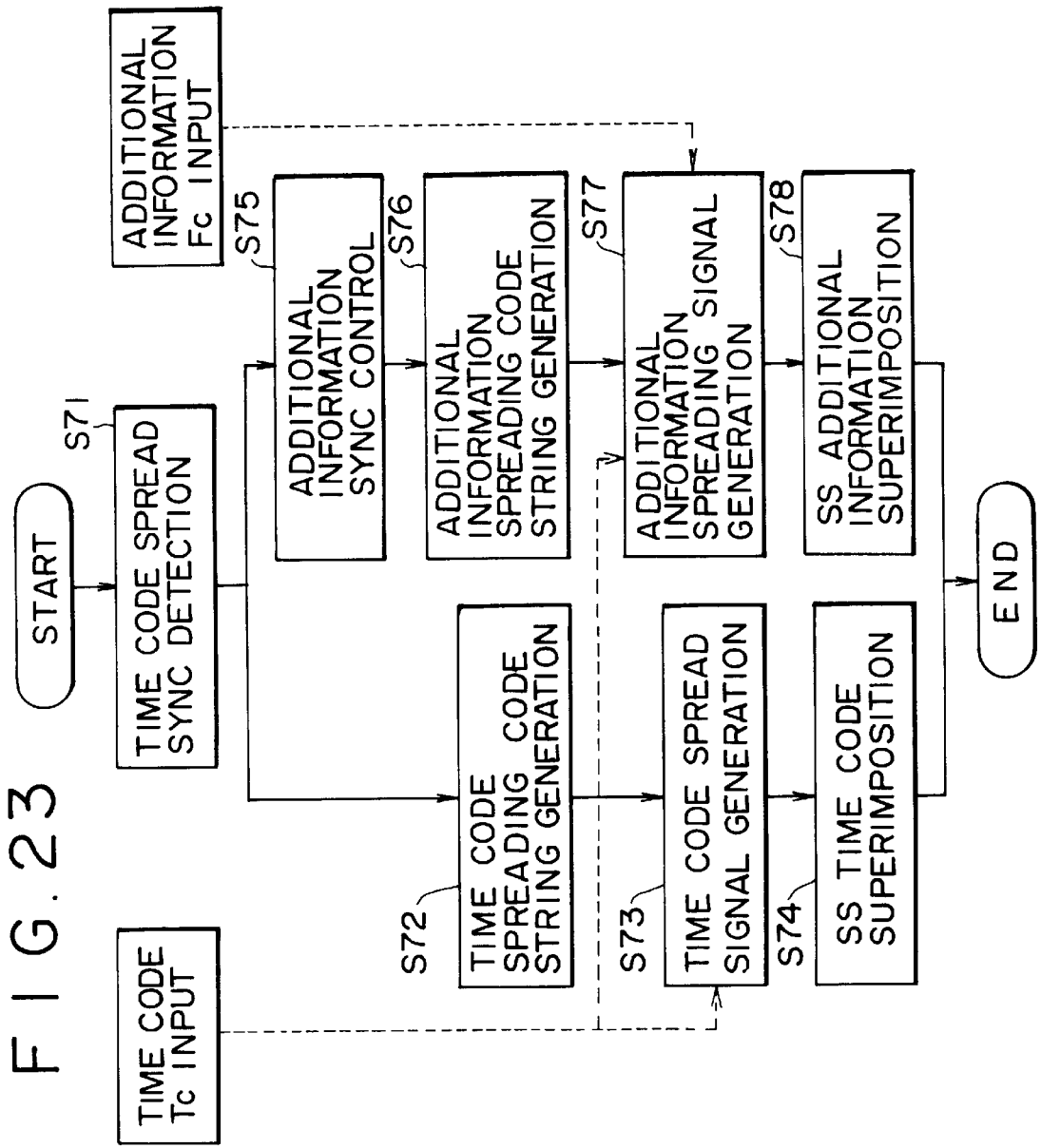
FIG. 23 is a flow chart for describing operations in the third embodiment shown in FIG. 22.
Figure 24:
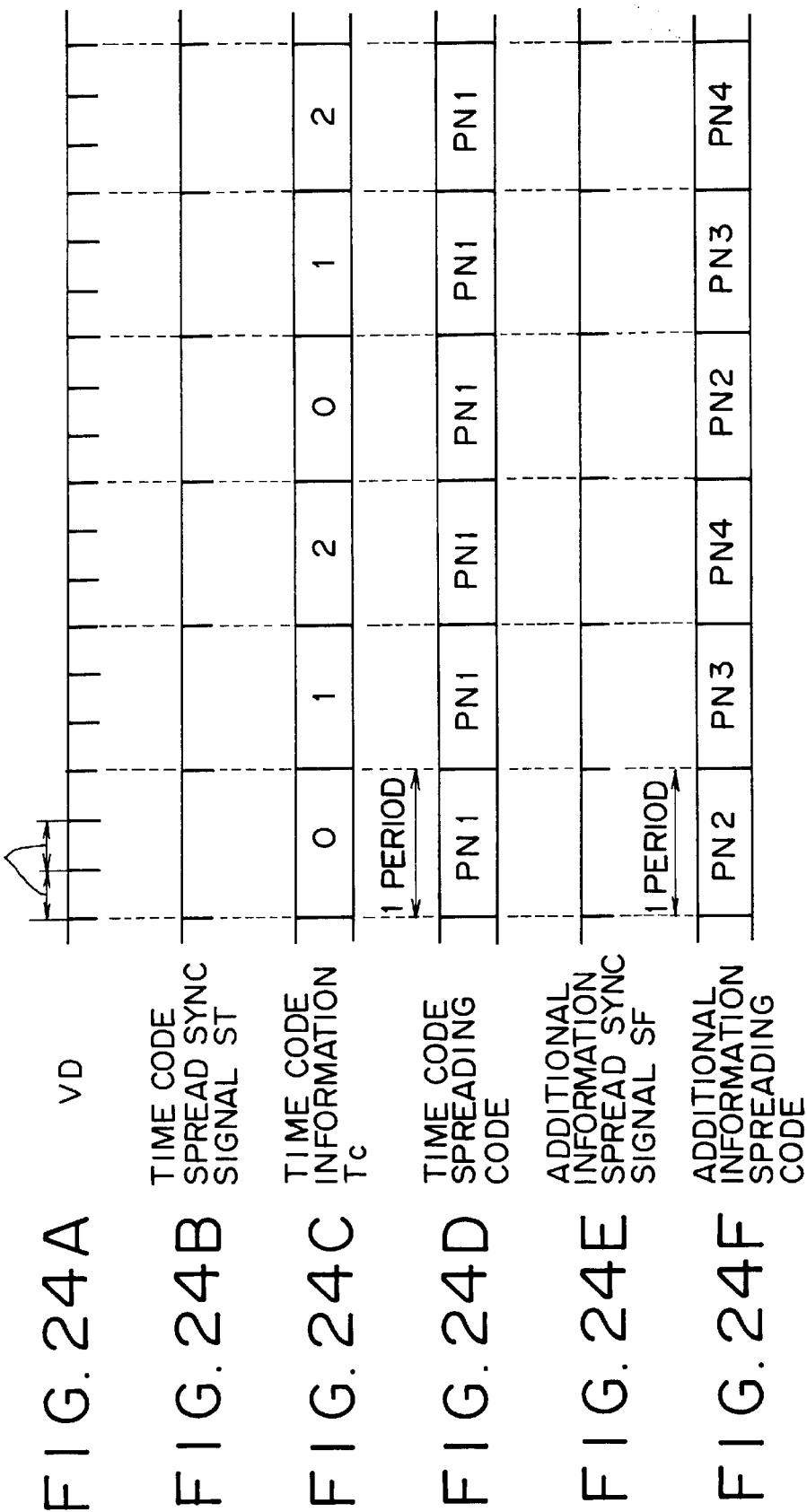
FIG. 24A–FIG. 24F are a time chart for describing operations in the third embodiment shown in FIG. 22.

FIG. 22 is a block diagram for illustrating an exemplary structure of a information addition device 70 of the third embodiment. FIG. 23 is a flow sheet for describing a flow of operation in the information addition device 70. FIG. 24 is a time chart for describing operations in the information addition device 70.

As shown in FIG. 22, the information addition device 70 of the third embodiment comprises a time code spread sync unit 71, a time code spread signal generation unit 72, a time code spread signal superimposition unit 73, an additional information spread sync unit 74, an additional information spread signal generation unit 75, and an additional information spread signal superimposition unit 76.

The information addition device 70 has the same block structure comprising the same structural components as the above-mentioned information addition device 30 of the first embodiment shown in FIG. 11 excepting that the information addition device 70 in the third embodiment is structured so that the time code information Tc is supplied to the additional information spread signal generation unit 75 and the additional information spreading PN code string is changed correspondingly to the time code information Tc.

In detail, the time code spread sync unit 71 has the same structure as the above-mentioned time code spread sync unit 11 shown in FIG. 2, however in this information addition device 70, a signal having a period three times one period of the vertical sync signal VD (refer to FIG. 24A) of the input video signal Vi is used as the time code spread sync signal ST (refer to FIG. 24B). The time code spread sync signal ST corresponds to the above-mentioned reset signal RE. In this information addition device 70, the time code information Tc is information which changes every 3 vertical periods synchronously to the vertical sync signal VD as shown in FIG. 24C.

The time code spread signal generation unit 72 has the same structure as that shown in FIG. 5, however, in this embodiment, because the time code spread sync signal ST is a signal of 3 vertical periods, a code string PN1 of 3 vertical periods is generated as the spreading PN code string for time code information Tc, the time code information Tc is spectrally spread using this PN code string PN1, and a time code spread signal is generated.

The time code spread signal superimposition unit 73 has the quite same structure as the above-mentioned superimposition unit 13, and superimposes the time code spread signal on the input video signal Vi.

Next, the additional information spread sync unit 74 generates an additional information spread sync signal SF from the time code spread sync signal ST supplied from the time code spread sync unit 71. In this embodiment, an additional information spread sync signal SF is generated as the signal having the same period as that of the time code spread sync signal ST shown in FIG. 24B. The generated additional information spread sync signal SF is supplied to the additional information spread signal generation unit 75.

The additional information spread signal generation unit 75 has the similar structure to the additional information spread signal generation unit 32 shown in FIG. 11, however the additional information spread signal generation unit 75 is different from the structure shown in FIG. 11 in that a plurality of PN code string generation units is provided in this embodiment, one of these plurality of PN code string generation units is selected correspondingly to the time code information Tc, and a PN code string to be generated is changed correspondingly to the time code information Tc.

In detail, in the additional information spread signal generation unit 75, the additional information spreading PN code string changes correspondingly to the time code information Tc as shown in FIG. 24F. In the example shown in FIG. 24F, if the time code information Tc is "0" then the corresponding PN code string is the code string PN2, if the time code information Tc is "1" then the corresponding PN code string is the code string PN3, and if the time code information Tc is "2" then the corresponding PN code string is the code string PN4.

The additional information spread signal generation unit 75 multiplies the additional information Fc by the PN code strings PN2, PN3, PN4, . . . generated synchronously to the additional information spread sync signal SF as described herein above, and generates a spectrally spread additional information namely an additional information spread signal as a multiplication output.

The additional information spread signal generated from the additional information spread signal generation unit 75 is supplied to the additional information spread signal superimposition unit 76. The superimposition unit 76 superimposes the additional information spread signal on the video signal Vi. The superimposition unit 76 outputs the output video signal Vo on which the time code spread signal and additional information spread signal are both superimposed.

Steps S71 to S74 shown in FIG. 23 show operations for generation and superimposition of the time code spread signal in the third embodiment.

In the third embodiment like the first embodiment, the additional information is spectrally spread over a plurality of fields, and the additional information spreading PN code string is changed correspondingly to the time code information Tc, thereby illegal alteration processing becomes more difficult if the additional information is a secret information such as an anti-duplication control signal.

Accordingly, the information addition device 70 is incorporated in a recording device and the video signal Vo is recorded in a recording medium using the recording device, thus the recording medium which is capable of performing surely duplication control if the additional information is, for example, an anti-duplication control signal.

A playback device with the information addition device 70 transmits surely the anti-duplication control signal to the recording side even if the duplication prevention control data recorded on, for example, TOC area or the area different from the area for video data, is illegally altered.

Figure 25:
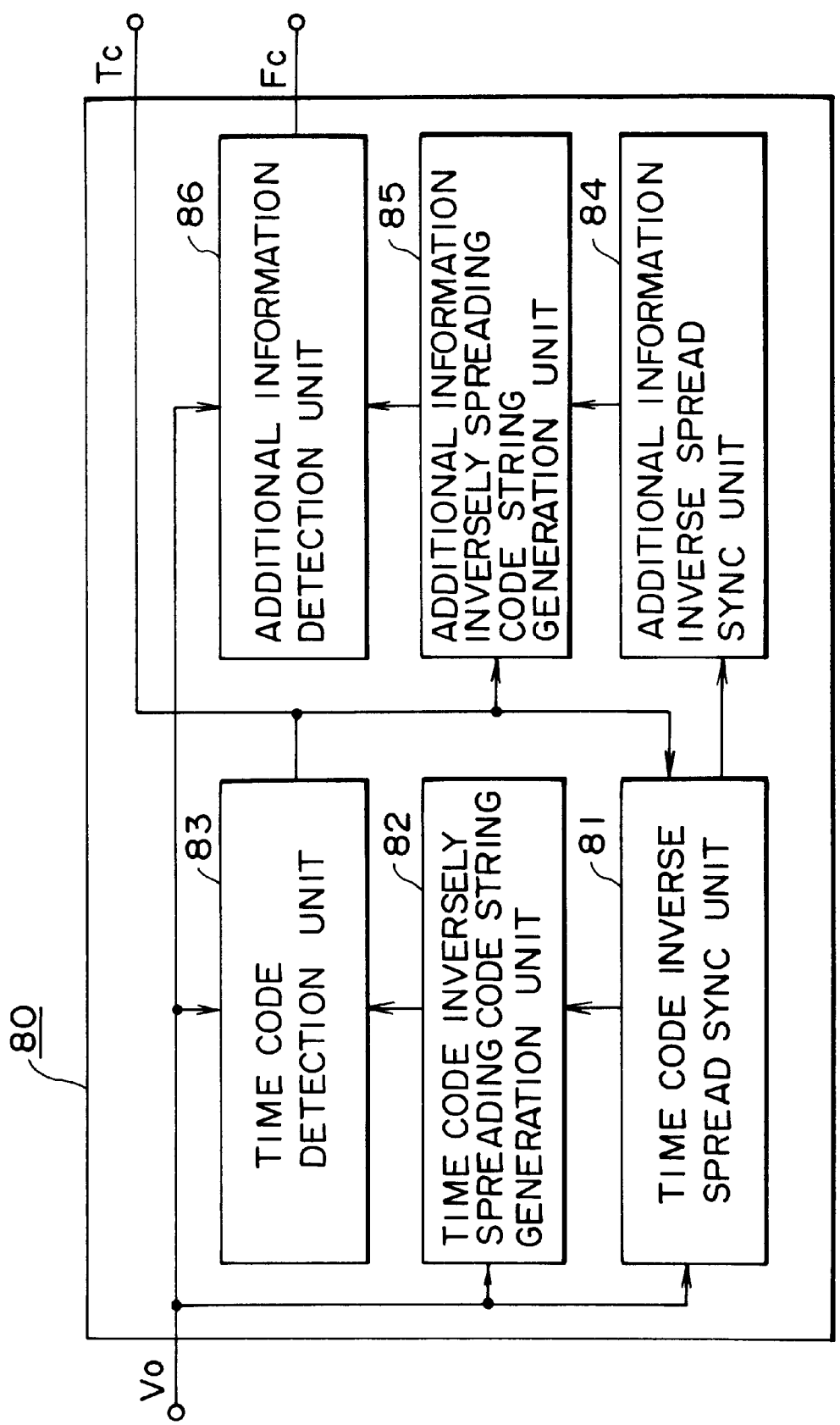
FIG. 25 is a block diagram for illustrating the third embodiment of the additional information detection device in accordance with the present invention.
Figure 26:
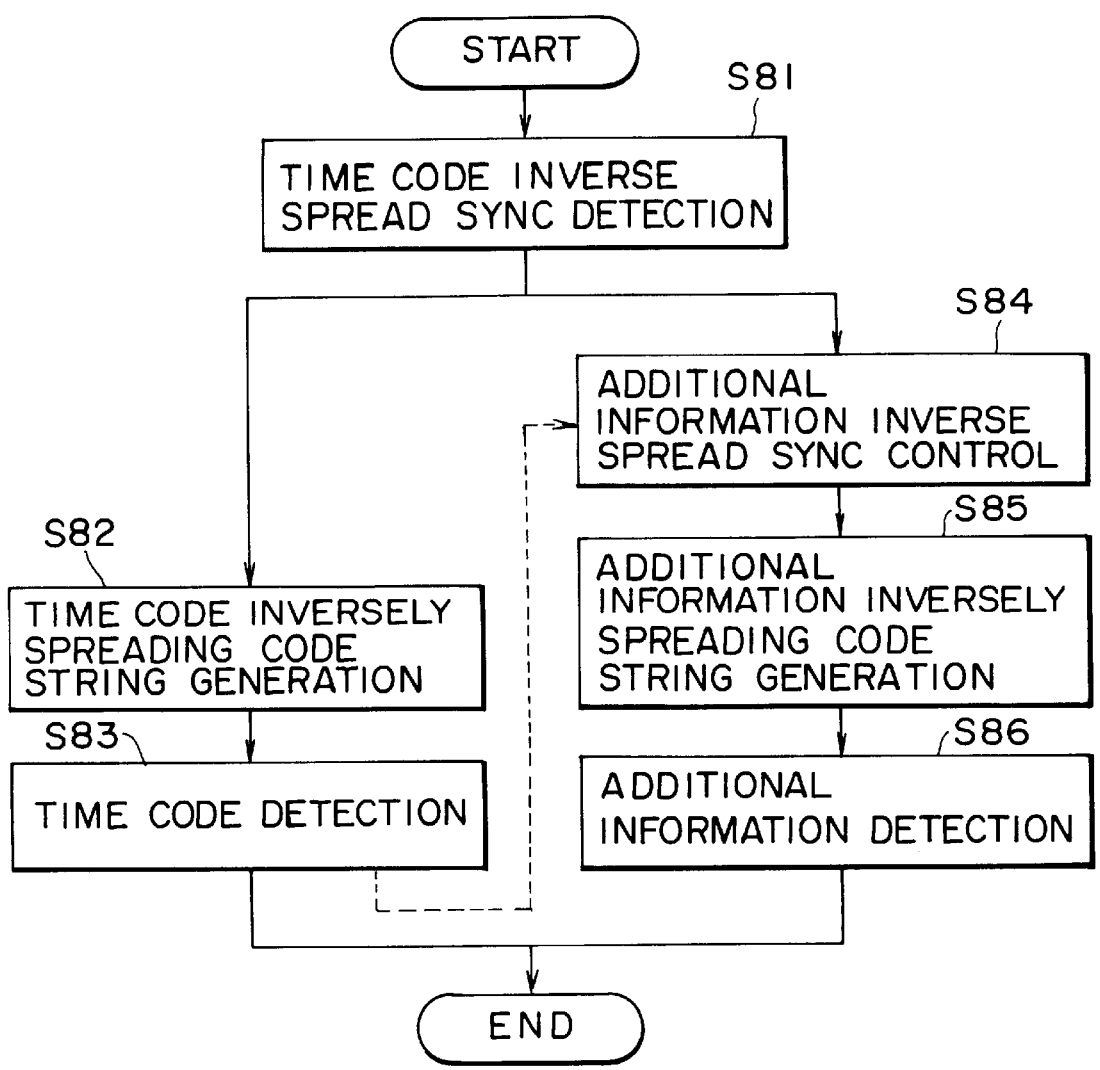
FIG. 26 is a flow chart for describing operations in the third embodiment shown in FIG. 25.

FIG. 25 is a block diagram for illustrating the structure of an additional information detection device 80 of the third embodiment for detecting and extracting from the video signal Vo the time code information and additional information superimposed on the video signal by the information addition device 70 of the third embodiment described with reference to FIGS. 22 to 24. FIG. 26 is a flow chart for describing operations of the additional information detection device 80.

The additional information detection device 80 of the third embodiment is provided with a time code inverse spread sync unit 81, a time code inversely spreading code string generation unit 82, a time code detection unit 83, an additional information inverse spread sync unit 84, an additional information inverse spread code string generation unit 85, and an additional information detection unit 86.

The additional information detection device 80 has the same block structure comprising the same structural components as the above-mentioned additional information detection device 40 of the first embodiment shown in FIG. 15 excepting that the additional information detection device 80 of the third embodiment is structured differently from the first embodiment in that the additional information inverse spread code string generation unit 85 is provided with a plurality of PN code string generation units, the time code information Tc detected by the time code detection unit 83 is supplied to the additional information inverse spread code string generation unit 85, and based on the time code information Tc, a PN code string different depending on the time code information Tc is generated correspondingly to the PN code string used for spectrally spreading the additional information Fc in the information addition device 70.

In detail, the structure comprising the time code inverse spread sync unit 81, time code inversely spreading code string generation unit 82, and time code detection unit 83 like the structure comprising the time code inverse spread sync unit 41, time code inversely spreading code string generation unit 42, and time code detection unit 43 of the first embodiment detects the time code information Tc from the video signal Vo. The detection operation of the time code information Tc is shown in the flow chart shown in FIG. 26 as the steps S81 to 83.

When the time code inverse spread sync signal is detected by the time code inverse spread sync unit 81, the additional information inverse spread sync unit 84 generates an additional information inverse spread sync signal having the same period as that of the time code inverse spread sync signal, and supplies it to the additional information inverse spread code string generation unit 85. The time code information Tc detected by the time code detection unit 83 is supplied to the additional information inverse spread code string generation unit 85. The additional information inverse spread code string generation unit 85 generates PN code strings PN2, PN3, PN4, PN2, PN3, PN4, . . . different correspondingly to the time code information Tc and synchronous to the additional information inverse spread sync signal, and supplies generated additional information inversely spreading PN code strings to the additional information detection unit 86. The additional information detection unit 86 performs inverse spectral spread processing on the video signal Vo and detects the additional information Fc. The detected additional information Fc is outputted for recording control.

Operations for detecting the additional information Fc is shown in the flow chart shown in FIG. 26 as the step S81 and steps 83 to S86.

In the third embodiment, the structure that the additional information spread signal generation unit 75 of the information addition device 70 and additional information inverse spread code string generation unit 85 of the additional information detection device 80 are provided with a plurality of PN code string generation units to obtain a plurality of types of PN code strings has been described herein above. However alternatively, the structure that the additional information spread signal generation unit 75 of the information addition device 70 and the additional information inverse spread code string generation unit 85 of the additional information detection device 80 are provided respectively with one PN code string generation unit, and PN code strings of different phases are extracted from the PN code string generated from the PN code string generation unit as the above-mentioned PN code string PN2, PN3, PN4, . . . may be applied.

In the above-mentioned description of the third embodiment, the period of the additional information spread sync signal is different correspondingly to the even number and odd number of the value of the time code information Tc, however alternatively, the present invention is by no means limited to this case, the period of the additional information spread sync signal may be different correspondingly to respective values of the time code information Tc.

In the third embodiment like the first embodiment, the additional information is spectrally spread over a plurality of fields, and the additional information spreading code string is changed correspondingly to the time code information Tc, thereby illegal alteration processing becomes more difficult if the additional information is a secret information such as an anti-duplication control signal.

Accordingly, incorporation of the additional information detection device 80 of the third embodiment in a recording device ensures duplication prevention control. By applying the recording/playback system that the information addition device 70 of the third embodiment is provided additionally to the playback device and the output video signal Vo is supplied to the recording device having the additional information detection device 80, a system which performs duplication prevention control surely is realized.

Figure 27:
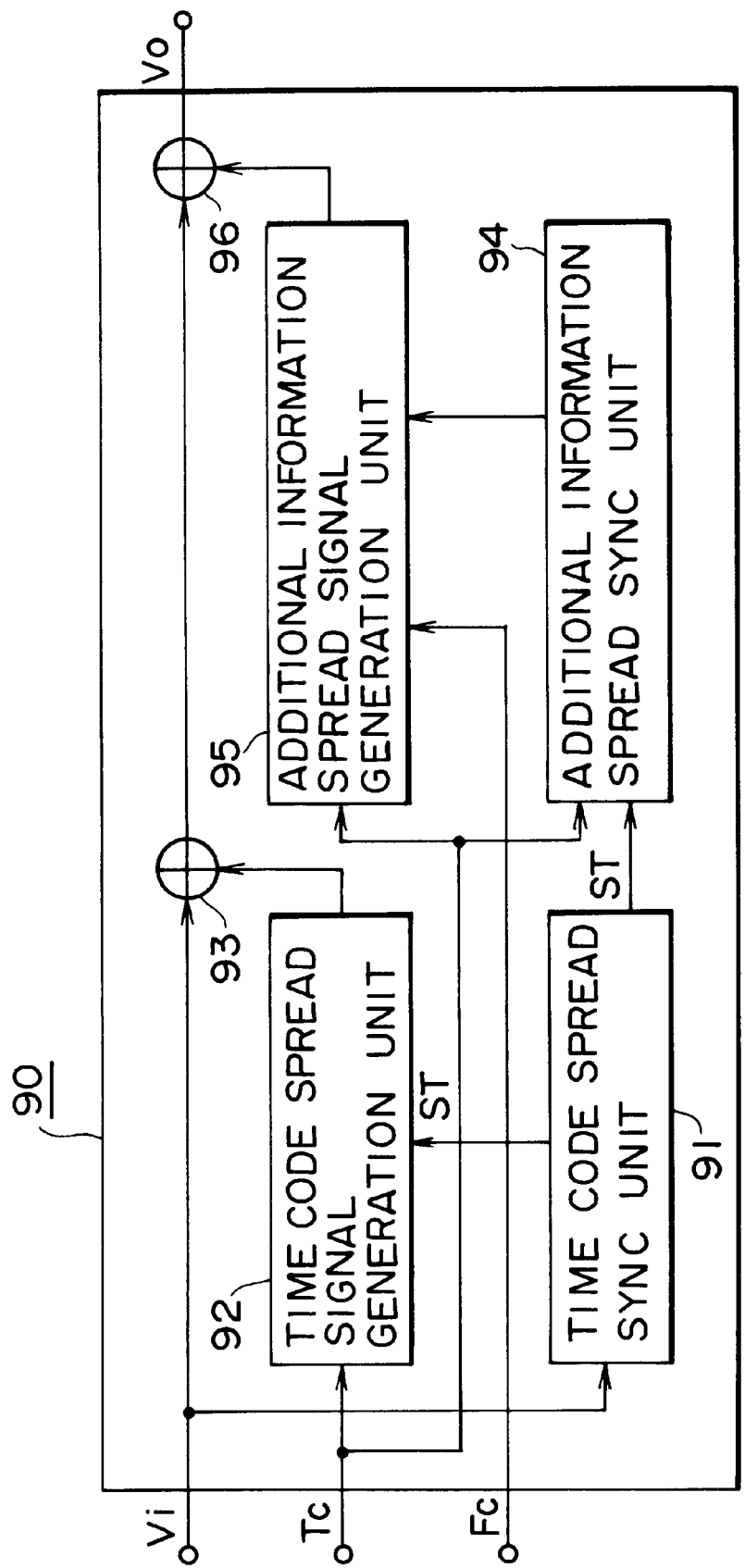
FIG. 27 is a block diagram for illustrating the fourth embodiment of the information addition device in accordance with the present invention.
Figure 28:
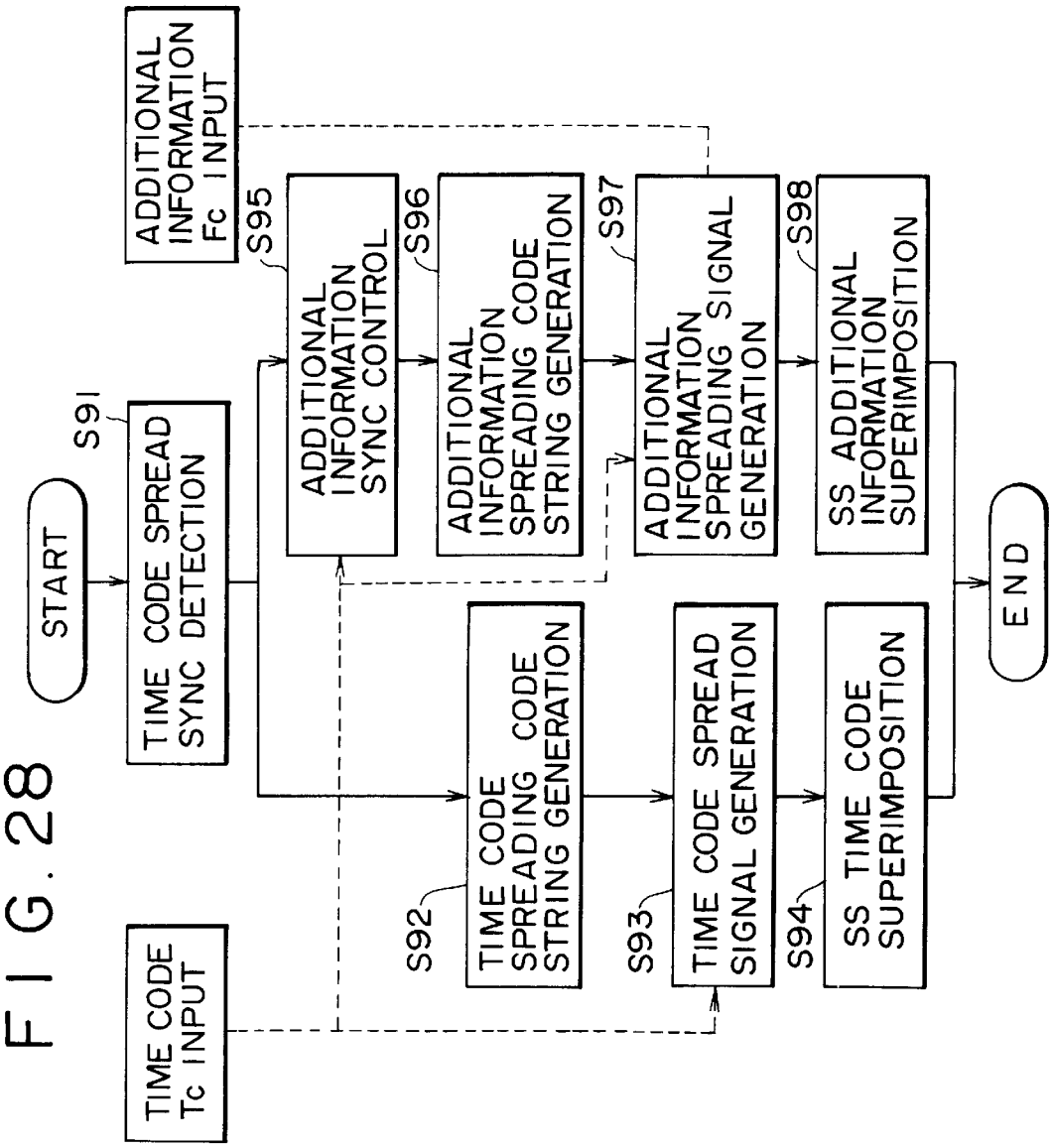
FIG. 28 is a flow chart for describing operations in the fourth embodiment shown in FIG. 27.
Figure 29:
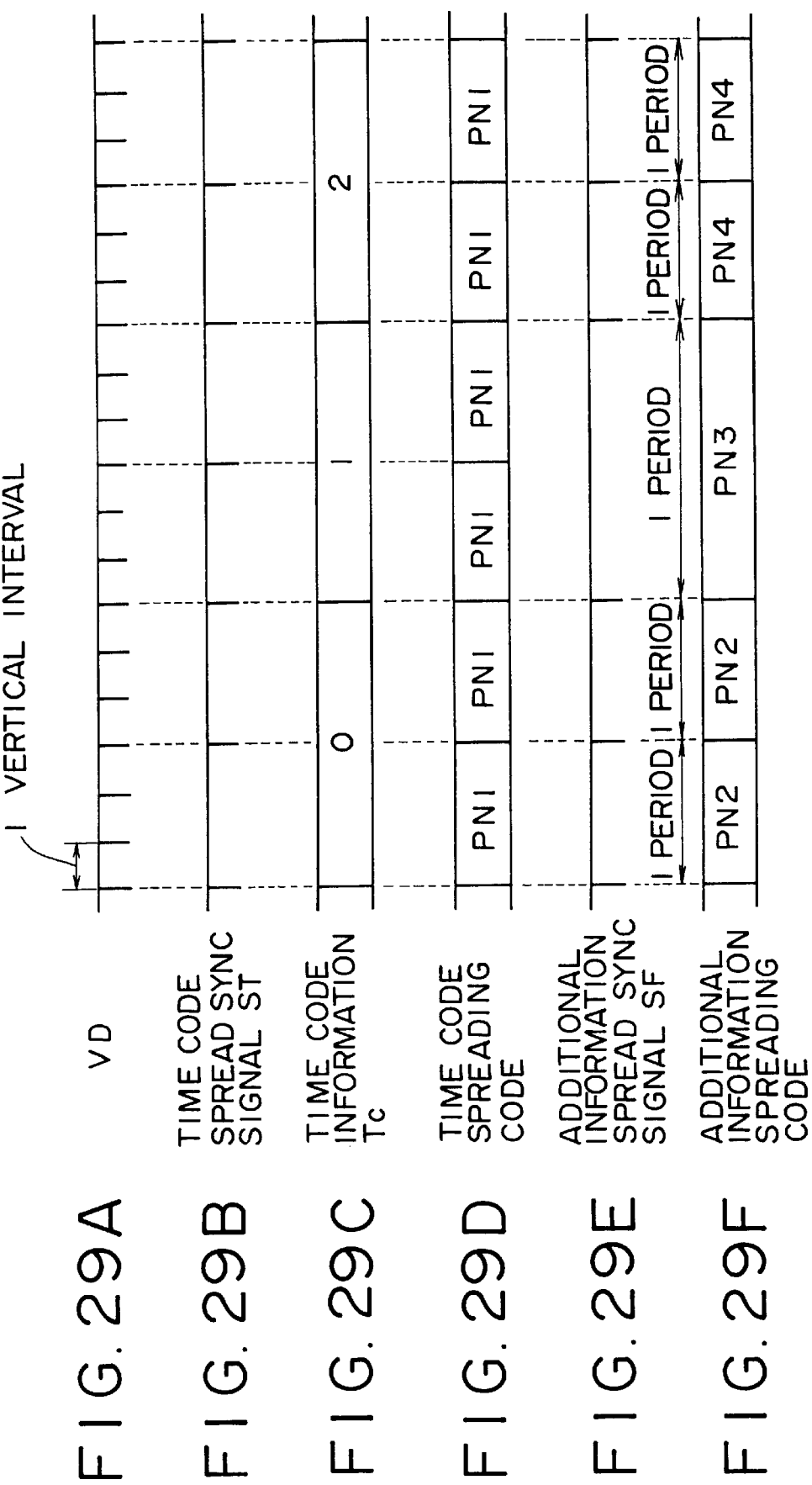
FIG. 29A–FIG. 29F are a time chart for describing operations in the fourth embodiment shown in FIG. 27.

FIG. 27 is a block diagram for illustrating an exemplary structure of an information addition device 90 of the fourth embodiment. FIG. 28 is a flow chart for describing operations in the information addition device 90 of the fourth embodiment. Further, FIG. 29 is a time chart for describing operations in the information addition device 90 of the fourth embodiment.

As shown in FIG. 27, the information addition device 90 of the fourth embodiment comprises a time code spread sync unit 91, a time code spread signal generation unit 92, a time code spread signal superimposition unit 93, and an additional information spread sync unit 94, an additional information spread signal generation unit 95, and an additional information spread signal superimposition unit 96.

The information addition device 90 has the same block structure comprising the same structural block components as the above-mentioned information addition device 30 of the first embodiment shown in FIG. 11 excepting that the information addition device 90 of the fourth embodiment is structured differently from the first embodiment in that the time code information Tc is supplied to the additional information spread sync unit 94, and the time code information Tc is supplied also to additional information spread signal generation unit 95. The fourth embodiment is structured so that the additional information spread sync signal is changed correspondingly to the time code information Tc and also the additional information spreading PN code string is changed correspondingly to the time code information Tc.

Though the time code spread sync unit 91 is structured in the same structure as the above-mentioned time code spread sync unit 11 shown in FIG. 2, in the information addition device 90, a signal having a period three times one period of the vertical sync signal VD (refer to FIG. 29A) of the input video signal Vi is used as the time code spread sync signal ST (refer to FIG. 29B). The time code spread sync signal ST corresponds to the above-mentioned reset signal RE. In the information addition device 90, the time code information Tc is changed every 3 vertical periods synchronously to the vertical sync signal.

Though the time code spread signal generation unit 92 has the same structure as that shown in FIG. 5, in this embodiment, because the time code spread sync signal ST is a signal of 3 vertical period, the code string PN1 of 3 vertical periods is generated as the time code information spreading PN code string, the time code information Tc is spectrally spread using the PN code string PN1 and a time code spread signal is generated.

The time code spread signal superimposition unit 93 has the quite same structure as the above-mentioned superimposition unit 13, and superimposes the time code spread signal on the input video signal Vi.

Next, the additional information spread sync unit 94 generates an additional information spread sync signal SF from the time code spread sync signal ST supplied from the time code spread sync unit 91 and the time code information Tc. In this embodiment, if the time code information Tc shown in FIG. 29C is, for example, an even number value (0 is assigned as an even number), then a signal having the same period as that of the time code spread sync signal ST is generated, and on the other hand, if the time code information Tc is, for example, an odd number value, then a signal having a period two times that of the time code spread sync signal ST is generated as shown in FIG. 29E. In other words, the period of the time code spread sync signal ST is changed correspondingly to the value of the time code information Tc. The additional information spread sync unit 94 supplies the generated additional information spread sync signal SF to the additional information spread signal generation unit 95.

The additional information spread signal generation unit 95 has the same structure as that of the additional information spread signal generation unit 35 shown in FIG. 11 excepting that the additional information spread signal generation unit 95 is structured differently from the additional information spread signal generation unit 32 in that a plurality of PN code string generation units is provided, any one of the plurality of PN code string generation units is selected correspondingly to the time code information Tc, and the PN code string is changed correspondingly to the time code information Tc.

In detail, in the additional information spread signal generation unit 95, the additional information spreading PN code string is generated synchronously to the additional information spread sync signal SF as shown in FIG. 29F, the generated PN code string is variable correspondingly to the time code information Tc. More in detail, for example as shown in FIG. 29F, if the time code information Tc is "0", then the corresponding PN code string is the code string PN2, if the time code information Tc is "1", then the corresponding PN code string is the code string PN3, and if the time code information Tc is "2", then the corresponding PN code string is the code string PN4.

In this case, because the additional information spread sync signal SF is different correspondingly to the value of the time code information Tc as described herein above, in the interval of 6 vertical periods where the value of time code information Tc is the even numbers such as "0" and "2", the code strings PN2 and PN4 corresponding to the respective time code information Tc repeats with a period of 3 vertical periods, on the other hand, in the interval of 6 vertical periods where the value of time code information Tc is the odd numbers such as "1", the code string PN3 corresponding to the time code information Tc repeats with a period of 6 vertical periods.

The additional information spread signal generation unit 95 multiplies the additional information Fc by PN code strings PN2, PN3, PN4, . . . generated synchronously to the additional information spread sync signal SF as described herein above, and generates the spectrally spread additional information namely additional information spread signal as a multiplication output.

The additional information spread signal generated from the additional information spread signal generation unit 95 is supplied to the additional information spread signal superimposition unit 96. The superimposition unit 96 superimposes the additional information spread signal on the video signal Vi. Then, the superimposition unit 96 outputs the output video signal Vo on which the time code spread signal and additional information spread signal are both superimposed.

Operations for generation and superimposition of the time code spread signal in the fourth embodiment is shown in the steps S91 to S94 in FIG. 28. Operations for generation and superimposition of the additional information spread signal is shown in the step S91 and steps S95 to S98.

In the fourth embodiment like the first embodiment, the additional information is spectrally spread over a plurality of fields, and the period of the additional information spread sync signal and additional information spreading PN code string are changed correspondingly to the time code information Tc, thereby illegal alteration processing becomes more difficult if the additional information is a secret information such as an anti-duplication control signal.

Accordingly, the information addition device 90 is incorporated in a recording device and the video signal Vo is recorded in a recording medium using the recording device, thereby a recording medium which is capable of performing surely duplication control is provided if the additional information is an anti-duplication control signal.

The playback device provided with the information addition device 90 transmits surely the anti-duplication control information to the recording device side even if the duplication prevention control data recorded, for example, on TOC area or on the area different from the area where the video data is recorded is altered illegally.

Figure 30:
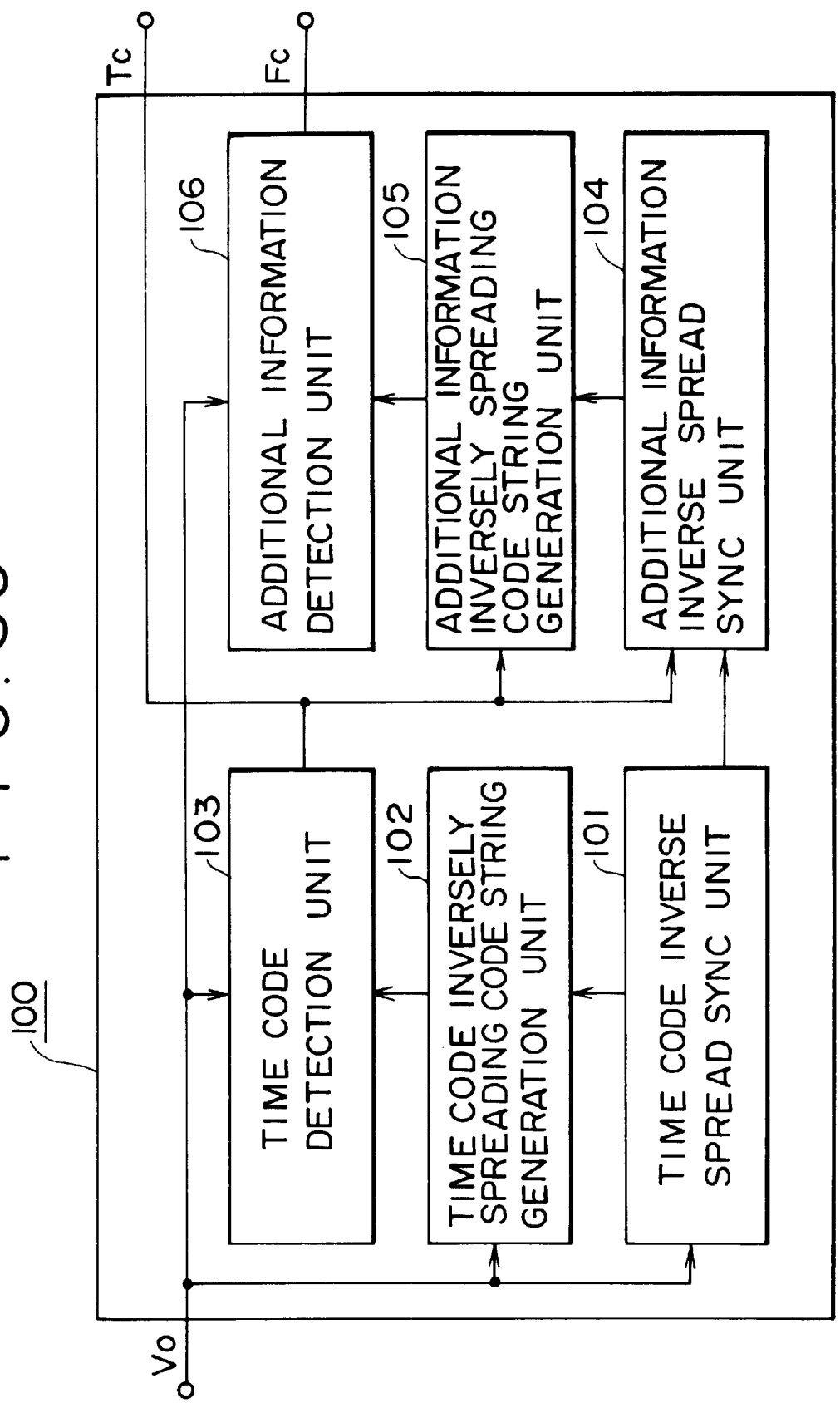
FIG. 30 is a block diagram for illustrating the fourth embodiment of the additional information detection device in accordance with the present invention.
Figure 31:
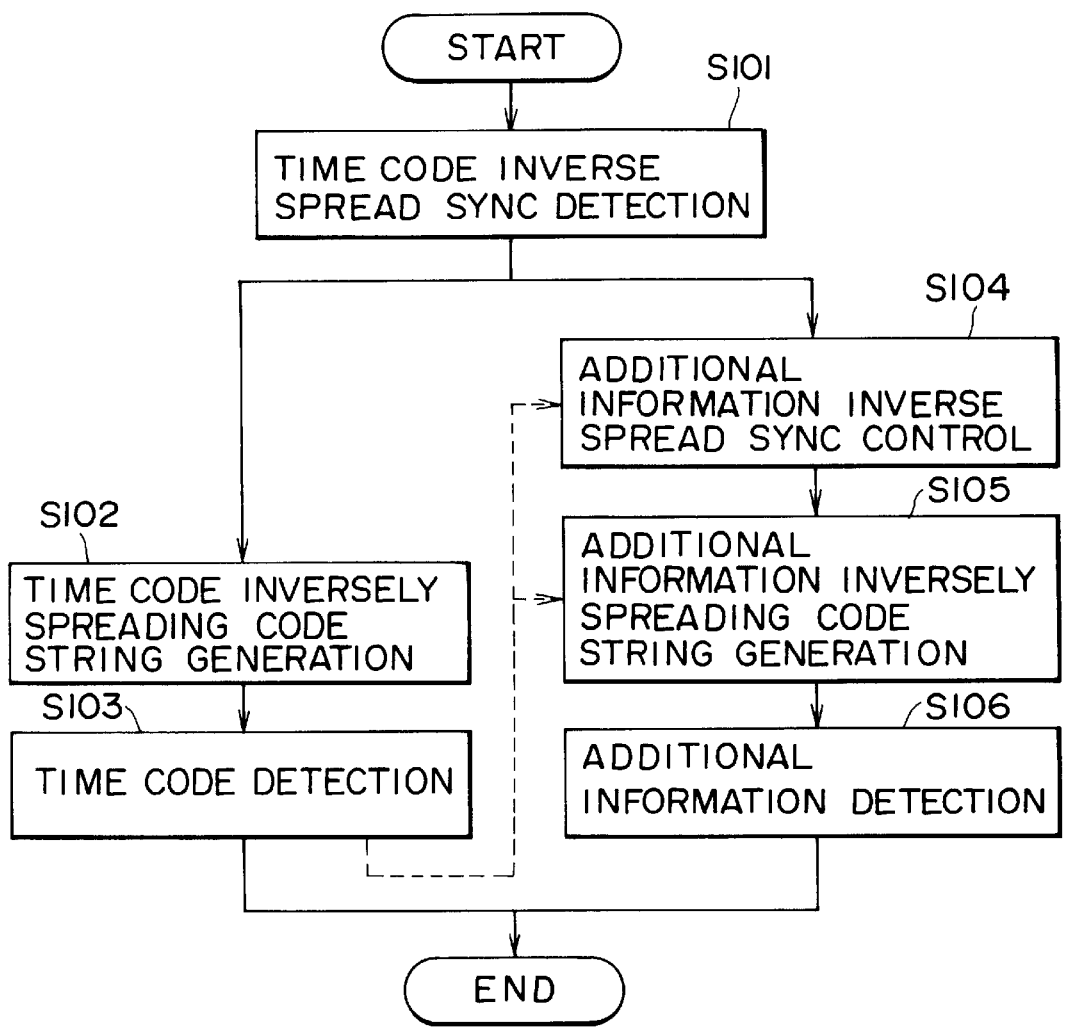
FIG. 31 is a flow chart for describing operations in the fourth embodiment shown in FIG. 30.

FIG. 30 is a block diagram for illustrating the structure of an additional information detection device 100 of the fourth embodiment for extracting from the video signal Vo and detecting the time code information and additional information superimposed on the video signal by the information addition device 90 of the fourth embodiment described with reference to FIGS. 27 to 29. FIG. 31 is a flow chart for describing operations in the additional information detection device 100.

The additional information detection device 100 of the fourth embodiment is provided with a time code inverse spread sync unit 101, a time code inversely spreading code string generation unit 102, a time code detection unit 103, an additional information inverse spread sync unit 104, an additional information inversely spreading code string generation unit 105, and an additional information detection unit 106.

The additional information detection device 100 has the same block structure comprising the same structural block components as the above-mentioned additional information detection device 40 of the first embodiment excepting that the additional information detection device 100 in the fourth embodiment is structured differently so that the time code information Tc detected by the time code detection unit 103 is supplied to the additional information inverse spread sync unit 104, and an additional information inverse spread sync signal SF is generated based on the time code information Tc and is structured differently so that the additional information inversely spreading code string generation unit 105 is provided with a plurality of PN code string generation units, the time code information Tc detected by the time code detection unit 103 is supplied to the additional information inversely spreading code string generation unit 105, and based on the time code information Tc, the different PN code string corresponding to the time code information Tc is generated correspondingly to the PN code string used for spectral spread of the additional information Fc by the information addition device 90.

The structure comprising the time code inverse spread sync unit 101, time code inversely spreading code string generation unit 102, and time code detection unit 103 detects the time code information Tc from the video signal Vo in the quite same manner as the structure comprising the time code inverse spread sync unit 41, time code inversely spreading code string generation unit 42, and time code detection unit 43 of the first embodiment shown in FIG. 15.

When the time code inverse spread sync signal is detected by the time code inverse spread sync unit 101 and the time code information Tc is detected by the time code detection unit 103, the additional information inverse spread sync unit 104 generates an additional information inverse spread sync signal from the time code inverse spread sync signal and time code information Tc.

The generated additional information inverse spread sync signal is supplied to the additional information inversely spreading code string generation unit 105. Separately, the time code information Tc detected by the time code detection unit 103 is supplied to the additional information inversely spreading code string generation unit 105. The additional information inversely spreading code string generation unit 105 generates the PN code strings PN2 (repeat period of 1 vertical period), PN3 (repeat period of 2 vertical periods), PN4 (repeat period of 1 vertical period), PN2, PN3, PN4, . . . which are synchronous to the additional information inverse spread sync signal and different correspondingly to the time code information Tc, and supplies the generated additional information inversely spreading PN code strings to the additional information detection unit 106. The additional information detection unit 106 performs inverse spectral spread on the video signal Vo, and the additional information Fc is detected. The detected additional information is outputted for recording control.

Operations for detecting the additional information Fc is shown as the step S101 and steps S103 to S106 in the flow chart for describing operations shown in FIG. 31.

As described herein above, in the fourth embodiment like the first embodiment, the additional information is spectrally spread over a plurality of fields, and particularly the additional information spreading code string is changed correspondingly to the time code information Tc, thereby illegal alteration processing becomes more difficult if the additional information is a secret information such as an anti-duplication control signal.

Accordingly, the information addition device 90 is incorporated in a recording device and the video signal Vo is recorded in a recording medium using the recording device, thus the recording medium which is capable of performing surely duplication control is provided, for example, if the additional information is an anti-duplication control signal.

The playback device provided with the information addition device 90 transmits surely the anti-duplication control information to the recording device side even if the duplication prevention control data recorded, for example, on TOC area or on the area different from the area where the video data is recorded is altered illegally.

In the above-mentioned fourth embodiment, the structure that the additional information spread signal generation unit 95 of the information addition device 90 and the additional information inversely spreading code string generation unit 105 of the additional information detection device 100 are provided respectively with a plurality of PN code string generation units to obtain a plurality of types of PN code strings has been used. However alternatively, the structure that the additional information spread signal generation unit 95 of the information addition device 90 and the additional information inversely spreading code string generation unit 105 of the additional information detection device 100 are provided respectively with one PN code string generation unit, the PN code strings having respectively different phases are extracted from the PN code strings generated from the PN code string generation unit as the above-mentioned PN code strings PN2, PN3, PN4, . . . may be used to obtain a plurality of PN code strings.

In the fourth embodiment described herein above, the case that the period of the additional information spread sync signal is changed correspondingly to the even number and odd number of the time code information Tc value has been described, however the present invention is by no means limited to the case, alternatively the period of the additional information spread sync signal may be changed corresponding to respective values of the time code information Tc.

In the fourth embodiment like the above-mentioned second embodiment, the method that the time code spread sync signal ST is changed to a signal having a period of 6 vertical periods synchronous to the time code information Tc, and the time code information Tc is spectrally spread using the PN code string which repeats with a period of 6 vertical periods may be applied.

In the above-mentioned information addition device and additional information detection device of the first to fourth embodiments, like the time code information addition device and time code information detection device of the embodiment, the input video signal Vi may be a digital video signal instead of the analog video signal.

In the above-mentioned first to fourth embodiments, the length of the spectral spread interval of the additional information is by no means limited to 3 fields or 6 fields, and can be longer.

Figure 32:
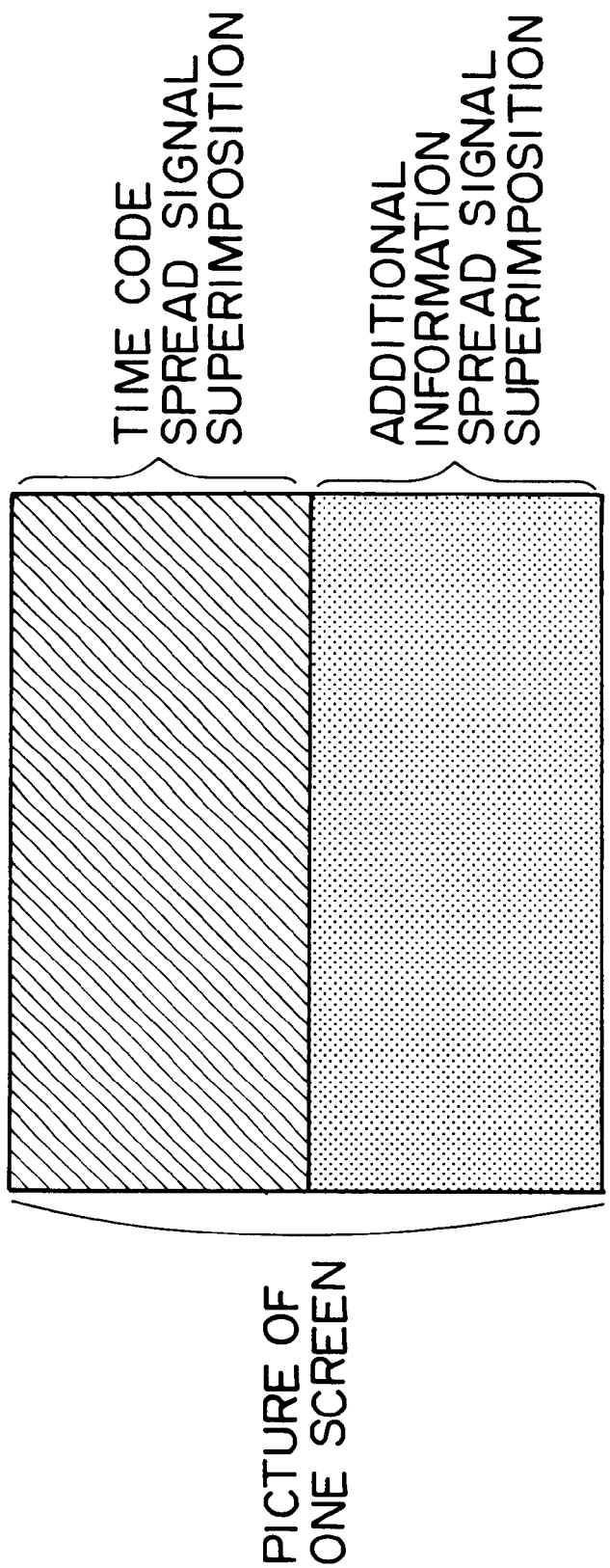
FIG. 32 is a diagram for describing one of other modified examples of the present invention.

In the above-mentioned information addition device and additional information detection device of the first to fourth embodiments, the time code information and additional information are superimposed over the entire interval of the video signal, however, alternatively a method that for example as shown in FIG. 32 wherein the time code information is superimposed on the interval of the upper half screen of the video signal, and the additional information is superimposed on the interval of the lower half screen of the video signal, that is, the time code information and additional information are superimposed not on the same interval but on the different interval of the video signal may be applied.

In such case, the level increment due to superimposition of the time code spread signal and additional information spread signal does not affect significantly, therefore the superimposition level is selected separately for the time code spread signal and additional information spread signal so as not to deteriorate the video signal, and the superimposition level is controlled easily.

In the above-mentioned example, the case that an antiduplication control signal is used as the additional information has bee described, however, the additional information is by no means limited to the case, various information may be used as the additional information.

The time code addition device, detection device, information addition device, and additional information detection device of the present invention have been applied to VTR DVD (digital video decrement) device as described hereinbefore, however, alternatively may be applied to, for example, transmission of the video signal via a network.

As described herein above, according to the invention described in the claim 1, the time code information is spectrally spread and added on the video signal, thereby the time code is added surely on the video signal, and the picture of respective fields is specified to the picture with respect to the original picture. As the result, much additional information to be superimposed is allowed to be used.

According to the invention described in claim 2, the additional information is spectrally spread and superimposed synchronously to the time code information superimposed on the video signal, thereby the additional information is spectrally spread with a large spread ratio over a plurality of fields.

According to the inventions described in claim 3, claim 4, and claim 5, the additional information is spectrally spread and superimposed synchronously to the time code information superimposed on the video signal and correspondingly to the time code information, thereby the additional information is spectrally spread with a large spread ratio over a plurality of fields and the secrecy of the additional information is improved.

What is claimed is:

1. A method for adding information to a video signal comprising:
    a step for generating a timing signal based on a sync signal of the video signal;
    a step for periodically generating a time code information signal synchronously to said timing signal;
    a step for periodically generating a first spectral spread code string synchronously to said timing signal;
    a step for generating a second spectral spread code string correspondingly to said time code information signal synchronously to said timing signal;
    a step for generating a spread time code signal by spectrally spreading said time code information signal using said first spectral spread code string;
    a step for generating a spread additional information signal by spectrally spreading an additional information signal using said second spectral spread code string; and
    a step for adding said spread time code signal and said spread additional information signal to said video signal.

2. The method for adding information to a video signal according to claim 1, wherein said second spectral spread code string has a period different than a period of said time code information signal.

3. The method for adding information to a video signal according to claim 2, wherein said second spectral spread code string has a different content corresponding to the period of said time code information signal.

4. A method for detecting information from a video signal for detecting a time code information signal having a period and an additional information signal from said video signal to which are added a spread time code information signal generated by spectrally spreading said time code information signal using a first spectral spread code string generated synchronously to a sync signal of said video signal and a spread additional information signal generated by spectrally spreading said additional information signal using a second spectral spread code string generated correspondingly to said time code information signal and synchronously to the sync signal of said video signal, said method comprising:
    a step for generating a timing signal based on the sync signal of said video signal;
    a step for generating a first spectral inversion spread code string synchronous to said sync signal;
    a step for detecting said time code information signal by performing spectral inversion spread on said video signal using said first spectral inversion spread code string;
    a step for generating a second spectral inversion spread code string correspondingly to said time code information signal and synchronously to said timing signal; and
    a step for detecting said additional information signal by performing spectral inversion spread on said video signal using said second spectral inversion spread code string.

5. The method for detecting information from a video signal according to claim 4, wherein said second spectral inversion spread code string has a period different than the period of said time code information signal.

6. The method for detecting information from a video signal according to claim 4, wherein said second spectral inversion spread code string has a different content corresponding to the period of said time code information signal.

7. A device for adding information to a video signal comprising:

timing signal generation means for generating a timing signal based on a sync signal of the video signal;

time code information signal generation means for periodically generating a time code information signal synchronously to said timing signal;

first spectral spread code generation means for periodically generating a first spectral spread code string synchronously to said timing signal;

second spectral spread code generation means for generating a second spectral spread code string correspondingly to said time code information signal synchronously to said timing signal;

first spread signal generation means for generating a spread time code signal by spectrally spreading said time code information signal using said first spectral spread code string;

second spread signal generation means for generating a spread additional information signal by spectrally spreading an additional information signal using said second spectral spread code string; and signal addition means for adding said spread time code signal and said spread additional information signal to said video signal.

8. The device for adding information to a video signal according to claim 7, wherein said second spectral spread code string has a period different than a period of said time code information signal.

9. The device for adding information to a video signal according to claim 7, wherein said second spectral spread code string has a different content corresponding to the period of said time code information signal.

10. A device for detecting information from a video signal for detecting a time code information signal having a period and an additional information signal from the video signal to which are added a spread time code information signal generated by spectrally spreading said time code information signal using a first spectral spread code string generated synchronously to a sync signal of said video signal and a spread additional information signal generated by spectrally spreading said additional information signal using a second spectral spread code string generated correspondingly to said time code information signal and synchronously to the sync signal of said video signal, said device comprising:

timing signal generation means for generating a timing signal based on the sync signal of said video signal;

first spectral inversion spread code generation means for generating a first spectral inversion spread code string synchronous to said sync signal;

first spectral inversion spread means for detecting said time code information signal by performing spectral inversion spread on said video signal using said first spectral inversion spread code string;

second spectral inversion spread code generation means for generating a second spectral inversion spread code string correspondingly to said time code information signal and synchronously to said timing signal; and second spectral inversion spread means for detecting said additional information signal by performing spectral inversion spread on said video signal using said second spectral inversion spread code string.

11. The device for detecting information from a video signal according to claim 10, wherein said second spectral inversion spread code string has a period different than the period of said time code information signal.

12. The device for detecting information from a video signal according to claim 10, wherein said second spectral inversion spread code string has a different content corresponding to the period of said time code information signal.

13. A recording medium containing a video signal recorded thereon to which are added a spread time code information signal generated by spectrally spreading a time code information signal using a first spectral spread code string generated synchronously to a sync signal of said video signal and a spread additional information signal generated by spectrally spreading an additional information signal using a second spectral spread code string generated correspondingly to said time code information signal and synchronously to the sync signal of said video signal.

* * * * *